(12) United States Patent
Miller

(10) Patent No.: US 8,633,604 B2
(45) Date of Patent: Jan. 21, 2014

(54) ENGINE

(76) Inventor: Michael Miller, Annapolis, MD (US)

(*) Notice: Subject to any disclaimer, the term of this patent is extended or adjusted under 35 U.S.C. 154(b) by 223 days.

(21) Appl. No.: 13/053,893

(22) Filed: Mar. 22, 2011

(65) Prior Publication Data

US 2011/0169277 A1 Jul. 14, 2011

Related U.S. Application Data

(63) Continuation-in-part of application No. 12/711,173, filed on Feb. 23, 2010, and a continuation-in-part of application No. 11/676,416, filed on Feb. 19, 2007, now Pat. No. 7,694,515.

(51) Int. Cl.
*F01K 25/10* (2006.01)

(52) U.S. Cl.
USPC ............... 290/1 R; 60/531; 60/675

(58) Field of Classification Search
USPC .......... 222/249; 310/14, 23, 30, 34; 60/531
See application file for complete search history.

(56) References Cited

U.S. PATENT DOCUMENTS

| | | | | |
|---|---|---|---|---|
| 243,909 | A | * 7/1881 | Iske | ............... 60/675 |
| 458,872 | A | * 9/1891 | Van | ............... 310/30 |
| 3,358,451 | A | 12/1967 | Feldman et al. | |
| 3,441,482 | A | 4/1969 | Avery | |
| 3,546,473 | A | * 12/1970 | Rich | ............... 290/42 |
| 3,636,706 | A | 1/1972 | Minto | |
| 3,659,416 | A | 5/1972 | Brown | |
| 3,901,033 | A | 8/1975 | McAlister | |
| 3,975,097 | A | 8/1976 | Minto | |
| 4,051,678 | A | 10/1977 | Yates | |
| 4,131,171 | A | 12/1978 | Keyes | |
| 4,291,755 | A | 9/1981 | Minto | |
| 4,342,920 | A | * 8/1982 | Bucknam | ............... 290/1 R |
| 4,399,368 | A | * 8/1983 | Bucknam | ............... 290/1 R |

(Continued)

FOREIGN PATENT DOCUMENTS

| GB | 1251484 | 10/1971 |
|---|---|---|
| GB | 1301214 | 10/1972 |

OTHER PUBLICATIONS

International Search Report in corresponding PCT application PCT/US08/54243.

(Continued)

*Primary Examiner* — Kenneth Bomberg
*Assistant Examiner* — Shafiq Mian
(74) *Attorney, Agent, or Firm* — August Law, LLC; George Willinghan

(57) ABSTRACT

An engine is provided that utilizes an active heat exchanger such as a heat pump to transfer heat into and remove heat from a low boiling point liquid that is disposed in a pair of diametrically opposed containers. The addition of heat into the low-boiling point liquid causes the liquid to move vertically from a bottom container to a top container, transforming the transferred heat energy into potential energy. The top container is allowed to fall under the weight of the transferred liquid, transforming the potential energy to kinetic energy which is used to perform the desired work. The expanding low-boiling point liquid can also be used to advance a magnetic back and forth through a wire coiling to produce an electric current, converting the transferred heat energy into electrical energy. The use of an active heat exchanger such as a heat pump permits the use of one unit of electrical energy to transfer 3 to 5 units of heat energy.

19 Claims, 11 Drawing Sheets

(56) References Cited

U.S. PATENT DOCUMENTS

| | | | |
|---|---|---|---|
| 4,403,643 A | | 9/1983 | Minto |
| 4,637,211 A | * | 1/1987 | White et al. .................. 60/650 |
| 5,228,293 A | | 7/1993 | Vitale |
| 6,688,048 B2 | * | 2/2004 | Staschik ..................... 52/79.1 |
| 6,978,610 B2 | * | 12/2005 | Carnahan ..................... 60/495 |
| 7,644,648 B2 | * | 1/2010 | Minowa et al. ................. 92/88 |
| 7,692,320 B2 | * | 4/2010 | Lemieux ..................... 290/1 R |
| 2002/0100576 A1 | * | 8/2002 | Hua ............................ 165/45 |
| 2004/0140875 A1 | * | 7/2004 | Strom ......................... 335/306 |
| 2005/0246919 A1 | * | 11/2005 | Delons ......................... 34/93 |

OTHER PUBLICATIONS

Wallace Minto: Freon Power Wheel from www.rexresearch.com (37 pages).

Minto Wheel from the Mother Earth News, Issue 40, Jul. 1976.

Wally Minto's Wonder Wheel, Popular Science, Mar. 1976.

* cited by examiner

ENGINE

CROSS-REFERENCE TO RELATED APPLICATIONS

The present application is a continuation-in-part of U.S. patent application Ser. No. 12/711,173 filed Feb. 23, 2010 which is a continuation-in-part of U.S. patent application Ser. No. 11/676,416 filed Feb. 19, 2007 which issued as U.S. Pat. No. 7,694,515 on Apr. 13, 2010. The entire disclosures of both applications are incorporated herein by reference.

FIELD OF THE INVENTION

The present invention is directed to improvements in the construction, operation and application of low temperature gradient engines.

BACKGROUND OF THE INVENTION

A slow moving, high torque engine or generator is known that operates on a very small temperature differential. This engine is commonly referred to as a Minto Wheel after its inventor Wallace Minto. The engine is arranged as a wheel that contains a series of sealed containers. The sealed containers are placed around the rim of the wheel and are aligned as diametrically opposed pairs. Each diametrically opposed pair is in fluid connection through a tube. The wheel rotates in a vertical plane. In any given pair at any given moment in time during the rotation, one of the containers is moving in a generally upward direction, and the other container is moving in a generally downward direction. At one position in the rotation, the containers are aligned vertically, with one container at the top being in the uppermost position and one container at the bottom being in the lowermost position. Each container moves between the uppermost and lowermost positions.

Each opposed pair of containers and the associated connecting tube form a sealed unit. Into each sealed unit a volume of a low-boiling liquid, for example propane, butane, carbon dioxide or Freon is introduced. For a given pair located at or near the vertically aligned position, most of the introduced volume of liquid is disposed in the lowermost container. The lowermost container is then exposed to a very mild increase in temperature, for example an increase of as little as 2° centigrade or about 3.5° F. Since such small temperature differences are abundant in nature, for example the temperature difference between water and cooler air or the difference between direct sunshine and shade, the heat necessary for imparting the mild increase in temperature is derived from a passive source. This passive source is a water bath containing hot, solar heated water through which the containers pass as the wheel rotates.

The small temperature increase in the liquid in the lowermost container vaporizes a portion of the liquid, producing a higher pressure on the surface of the liquid. This pressure forces the liquid up the connecting tube and into the uppermost container. This transfer of liquid from the lowermost container to the uppermost container transfers mass to the uppermost container, causing the container to increase in weight while the lowermost container decreases on weight. Gravity pulls the uppermost container downward, turning the wheel in a manner similar to the turning of a water wheel. As the previously uppermost container approaches the bottom, i.e. approaches the lowermost position, the container is exposed to the heat source. In this case, the container passes through the hot water bath. Upon exposure to the heat source, the liquid in the now lowermost container is again forced through the connecting tube to the other container, which is now the uppermost container having cooled as it traveled upward. This cycle of liquid transfer between opposed containers is repeated continuously to produce constant rotational motion in the wheel. This rotational motion can be used for any desired mechanical work. Wheels of modest size can perform such tasks as pumping water for irrigation, grinding food grains and generating small amounts of machine power. The wheel turns relatively slowly, but produces enormous torque. This high torque rotational motion can be geared up to produce any speed desired at the final output shaft. Although output can be converted to higher speeds, the wheel or engine is most effective for applications that utilize high torque at low speed.

The horsepower produced by the rotating wheel is proportional to the product of torque and speed, i.e., revolutions per minute of the wheel. For a given wheel exposed to a given temperature difference between opposed containers, a particular maximum horsepower is produced when fully loaded. This maximum horsepower, i.e. the power output, of the wheel is proportional to the rate at which heat is transferred into the liquid in the lowermost container and out of the vapor phase in the uppermost container. The greater the rate of heat transfer and the greater the temperature difference between the lowermost container and the uppermost container, the greater the power output and efficiency of conversion of heat to power. For the passively heated wheels and containers created from small tanks or lengths of cylindrical pipe, the temperature gradient and ability to transfer heat into and out of the containers is limited, limiting the power output of the engine.

In addition to the heat transfer rate limitations, conventional arrangements of the wheel fix each container into a given position along the wheel. Therefore, each container is heated in series and can only be heated once it approaches the bottom of the wheel. Also, by fixing all of the containers together in series in a single wheel, each container in the wheel must rotate at the same given rate.

Therefore, arrangements of an engine or generator that utilize the low-boiling liquid and that produce greater power output by providing for an increase in temperature differential and an increased rate of heat transfer are desired. These arrangements would provide for the simultaneous heating and cooling of opposed containers. In addition, multiple containers could be heated in parallel, and each pair of containers could rotate at speeds independent of the other pairs up to the free fall speed of a given container.

SUMMARY OF THE INVENTION

Systems in accordance with exemplary embodiments of the present invention utilize active heat transfer devices such as heat pumps to transfer heat between the ambient atmosphere and a low boiling point liquid disposed in containers that are arranged as rotating pairs as in, for example, a Minto Wheel arrangement. Each pair of containers has at least one and potentially two integrated heat pumps. A heat pump is used to transfer energy, i.e. heat, into the lowermost container. At the same time, a heat pump is used to remove heat from the uppermost container. As the containers rotate, energy is recaptured. Depending upon the size of the unit and its efficiency, the recaptured energy would represent an energy savings.

In one embodiment, a plurality of container pairs are arranged along a common rotatable shaft. In one arrangement, all of the container pairs are fixed to the shaft and aligned at the same angle with respect to the circumference of the shaft. Alternatively, the containers are fixed to the shaft and aligned at different locations or angles around the circumference of the shaft so that at any given moment only a single container from one of the container pairs is located at a top or uppermost position. In one embodiment, the containers are not fixedly secured to the shaft but can rotate with respect to the shaft in at least one direction of rotation. For example, each pair of containers is arranged so that one of the containers is disposed on either end of an arm. This arm is attached to the shaft, preferably at a midpoint between the two containers. The attachment between the arm and the shaft is arranged so that the arm moves about the shaft freely during a portion of the rotation, i.e. the arm does not impart rotational motion to the shaft during a portion of the rotation about the shaft. Therefore, the uppermost container is allowed to free fall from the uppermost position to a point where the arm engages the shaft. As the container falls, the arm engages the drive shaft, accelerating the drive shaft. In one embodiment, the connection between the arm and shaft is arranged so that the shaft can rotate without imparting rotational motion to the arm. Therefore, when multiple arms are disposed along the shaft, the rotation of one arm about the shaft will not affect the rotation of other arms.

In one embodiment, the system includes a transmission or gearbox attached to the shaft to modify the rotational speed or torque that is outputted by the shaft. Suitable transmissions and gearboxes are known and available in the art. In one embodiment, a flywheel is provided in communication with the shaft. In one embodiment, a transmission is used to increase the speed of the flywheel.

The amount of work outputted by the rotating shaft, and hence the amount of energy recaptured by an electric generator or imparted to a mechanical device in communication with the rotating shaft, is directly proportional to the number of containers that are filled with working fluid, disposed in the uppermost position and ready to fall and to engage the drive shaft at any given time interval. In one embodiment, for example an embodiment suitable for industrial applications, the system is arranged to generate electricity. Other arrangements can be made to create hydraulic pressure. In addition, the system can be arranged as a portable or mobile system having containers that are each less than or equal to 20 inches wide and shaped such that their natural rotation would carry the uppermost container pass the 180° mark, such that when it became charged it would fall forwards by the pulling of gravity.

In accordance with one embodiment, the present invention is directed to an engine that includes two containers arranged as a diametrically opposed pair and at least one connecting tube in communication with each container such that the diametrically opposed pair is in fluid communication through the attached connecting tube. A volume of a low boiling point liquid is disposed in the diametrically opposed pair of containers and is capable of moving between the containers through the connecting tube. Suitable low boiling point liquids include chlorofluorocarbons, hydrofluorocarbons, liquid ammonia, propane, carbon dioxide or butane. In order to provide the heat transfer necessary to move the low boiling point liquid between containers, the engine includes at least one active heat exchanger in communication with each container. The active heat exchanger is capable of transferring heat to and removing heat from the containers. Preferably, the active heat exchanger is a heat pump.

In one embodiment, the engine includes two active heat exchangers arranged such that one of the active heat exchanger is in communication with each container. The active heat exchanger includes a controller portion and a heat exchanger portion in communication with the controller portion. The controller portion includes at least one compressor, at least one valve and control electronics. The controller portion is capable of directing the active heat exchanger to either transfer heat to or to extract heat from each one of the containers. The heat exchanger portion can have two portions arranged such that one heat exchanger portion is disposed in each one of the containers. In addition to the portions disposed in the container, at least one additional heat exchanger portion is provided to exchange heat with the ambient environment.

In addition to having just two containers, the engine can include a plurality of containers arranged as a plurality of diametrically opposed pairs. A plurality of connecting tubes attached to the containers is provided such that each diametrically opposed pair is in fluid communication through at least one of the connecting tubes. The low boiling point liquid is disposed in each one of the diametrically opposed pairs. The engine includes the active heat exchangers, and in one embodiment, a plurality of active heat exchangers, e.g., a plurality of heat pumps, is provided such that at least one active heat exchanger is in communication with each one of the diametrically opposed pairs of containers. In one embodiment, the engine includes a rotatable shaft of a given length that is in communication with pairs of containers such that the containers can impart rotational motion to the shaft. Each pair of containers rotates about the shaft in a plane that is substantially perpendicular to the shaft. Preferably, each pair of containers rotates about the shaft independent of the other pairs, and the planes in which the pairs rotate are generally parallel and spaced along a length of the shaft. In one embodiment, the engine also includes an arm attached to both containers in a given pair of containers such that each container in the pair is disposed on either end of the arm. The rotatable shaft is in contact with the arm at a point along the arm between the two containers, and the arm is shaped to engage the shaft to impart rotational motion from the arm to the shaft during at least a portion of each rotation of the arm around the shaft. Flywheels can be placed in communication with the shaft to store rotational energy, and transmissions can be placed in communication with the shaft to modify the speed or torque of the shaft.

In one embodiment, each arm is shaped to engage the shaft during only a portion of the rotation of the arm about the shaft. For example, the planes in which each pair of containers rotates are substantially vertical, and the containers in each pair oscillate between an uppermost position and a lowermost position. When moving from the uppermost position to the lower most position, each container is capable of free falling at least a portion of the distance between the uppermost position and the lowermost position. The engine can include a control mechanism to control the rotation of the pairs of containers about the shaft and hence the initiation of free fall of any given container. Therefore, the control mechanism times when a given container can begin a free fall from its uppermost position to its lowermost position.

In one embodiment, the present invention is directed to an engine that includes two containers arranged as a diametrically opposed pair in a vertical alignment having a top container and a bottom container. The top container has a first enclosed volume, and the bottom container has a second enclosed volume. Preferably, the first volume is greater than the second volume. A connecting arm is provided in communication with each container. This connecting arm includes a central hollow bore, and the diametrically opposed pair is in fluid communication through the hollow bore of the connecting arm. A volume of a low boiling point liquid is disposed in the bottom container. A wire coil is wrapped around the connecting arm between the two containers, and a flotation collar containing a permanent magnet is disposed in the hollow bore.

The engine includes an active heat exchanger, e.g., a heat pump, in communication with the bottom container to transfer heat to and to remove heat from the bottom container. In one embodiment, the active heat exchanger include a first active heat exchanger portion in communication with the liquid disposed in the bottom container and a second active heat exchanger portion disposed in the bottom container in a gas space above the liquid. The active heat exchanger also includes at least one additional active heat exchanger portion in communication with the controller portion and arranged to exchange heat with the ambient environment. The active heat exchanger includes a controller portion in communication with the first, second and additional heat exchanger portions. The controller portion includes at least one compressor, at least one valve and control electronics. The controller portion is capable of directing the active heat exchanger to either transfer heat to or to extract heat from the bottom container.

In accordance with one exemplary embodiment, the present invention is directed to an engine having two containers arranged in a vertical alignment as a top container and a bottom container. A generally cylindrical connecting arm is provided in communication with each container, and the connecting arm includes a central hollow bore. The connecting arm and central hollow bore have a first diameter at points of contact with the top and bottom containers and a second diameter disposed between the points of contact with the top and bottom containers. The second diameter is larger than the first diameter, i.e., the connecting arm and central hollow bore enlarge or bulge in the middle. The opposed pair of containers is in fluid communication through the central hollow bore of the connecting arm. A volume of a low boiling point liquid is provided in the bottom container, and a wire coil is wrapped around a portion of the connecting arm between the two containers having the second diameter, i.e., the large portion. A buoyant permanent magnet is disposed in the portion of the central hollow bore of the connecting arm having the second diameter, and an active heat exchanger is provided in communication with the bottom container. The active heat exchanger is capable of transferring heat to and removing heat from the bottom container. In one embodiment, this active heat exchanger is a heat pump.

In one embodiment, the active heat exchanger includes a first heat exchanger portion in communication with the liquid disposed in the bottom container, a second active heat exchanger portion disposed in the bottom container in a gas space above the liquid and a plurality of additional heat exchanger portions in communication with the controller portion and arranged to exchange heat with an ambient environment. Suitable low boiling point liquids include, chlorofluorocarbons, hydrofluorocarbons, liquid ammonia, propane, carbon dioxide and butane. In one embodiment, the buoyant permanent magnet is a hollow cylindrical magnet. Preferably, the entire outer surface of the hollow cylindrical magnet is a first pole, and the entire inner surface of the hollow cylindrical magnet is a second pole that is magnetically opposite the first pole. In one embodiment, the hollow cylindrical magnet is constructed from a plurality of individual thin flexible rectangular plate magnets arranged as a continuous outer layer of the hollow cylindrical magnet. In one embodiment, each individual plate magnet has an inner magnetic portion and an outer non-magnetic portion that extends around all four sides of the magnetic portion. The inner magnetic portion has a polarity running from a first face of the rectangular plate magnet to a second face of the rectangular plate magnet. The outer non-magnet portion has an insulating material or a dielectric material.

In one embodiment, the hollow cylindrical magnet has a circular cross-section with a diameter greater than the first diameter of the connecting arm and central hollow bore. Alternatively, the hollow cylindrical magnet has a non-circular cross-section. In one embodiment, the non-circular cross-section includes a plurality of bulges that increase an exterior surface area of the hollow cylindrical magnet.

The present invention is also directed to an engine having two containers arranged in a vertical alignment having a top container and a bottom container. A generally cylindrical connecting arm having a central hollow bore is provided in communication with each container. The connecting arm and the hollow central bore have a non-circular cross-section in a portion of the connecting arm disposed between the top and bottom containers, and the opposed pair of containers is in fluid communication through the hollow bore of the connecting arm. A volume of a low boiling point liquid is disposed in the bottom container, and a wire coil is wrapped around the portion of the connecting arm between the two containers having the non-circular cross section. A buoyant hollow cylindrical permanent magnet is disposed in the portion of the central hollow bore of the connecting arm having the non-circular cross-section. The hollow cylindrical permanent magnet has a complementary non-circular cross section to the non-circular cross section of the central hollow bore. An active heat exchanger is provided in communication with the bottom container and is capable of transferring heat to and removing heat from the bottom container.

The present invention is also directed to a combination heat transfer and electrical power generation system that uses a heat source from at least one of an agricultural or industrial application in combination with an embodiment of an engine in accordance with the present invention. In one embodiment, the engine includes two containers arranged in a vertical alignment as a top container and a bottom container. In one embodiment, a generally cylindrical connecting arm is provided in communication with each container. The connecting arm includes a central hollow bore, and the opposed pair of containers is in fluid communication through the central hollow bore of the connecting arm. A volume of a low boiling point liquid is disposed in the bottom container, and a wire coil is wrapped around the connecting arm between the two containers.

A buoyant permanent magnet is disposed in the central hollow bore of the connecting arm. The engine also includes an active heat exchanger having a first heat exchanger portion in communication with the liquid disposed in the bottom container, a second active heat exchanger portion disposed in the bottom container in a gas space above the liquid, and a plurality of additional heat exchanger portions in communication with the heat source and configured to exchange heat with the heat source. The first and second heat exchanger portions are configured transfer heat to and to remove heat from the bottom container. In one embodiment, the heat source is a distillation unit at a desalination plant or a greenhouse. An electrical load can be provided in communication with the wire coil, for example, at least one battery that the system is configured to trickle charge. In one embodiment, the plurality of additional heat exchangers is configured as a condenser to recover water from the heat source.

DETAILED DESCRIPTION

Systems and methods in accordance with exemplary embodiments of the present invention incorporate active heat exchangers, for example heat pumps, into engines that use the expansion of low-boiling point liquids in a sealed rotational device to produce useful mechanical work. The active heat exchanger is used to move heat from the ambient environment into the low-boiling point liquids contained within the engine. In an embodiment where the active heat exchanger is a heat pump, the evaporation and condensation of a refrigerant are used to transfer heat into, and if desired out of, the low-boiling point liquids of the engine. The operation of heat pumps generally is known in the art. The heat pump consumes energy, for example electrical energy, to power an electric compressor. However, the heat pump can move or transfer more energy than it consumes. For example, the consumption of one unit of electrical energy by the heat pump results in the transfer of three, four or five units of thermal or heat energy. This transferred heat energy is used by the engine to increase the temperature of the low-boiling point liquid, which is used to produce the desired power output from the engine. This ability to use one unit of energy to transfer three or more units of energy is used to produce a desired electrical or mechanical output and provides an increased operating efficiency in exemplary embodiments of engines in accordance with the present invention.

Figure 1:
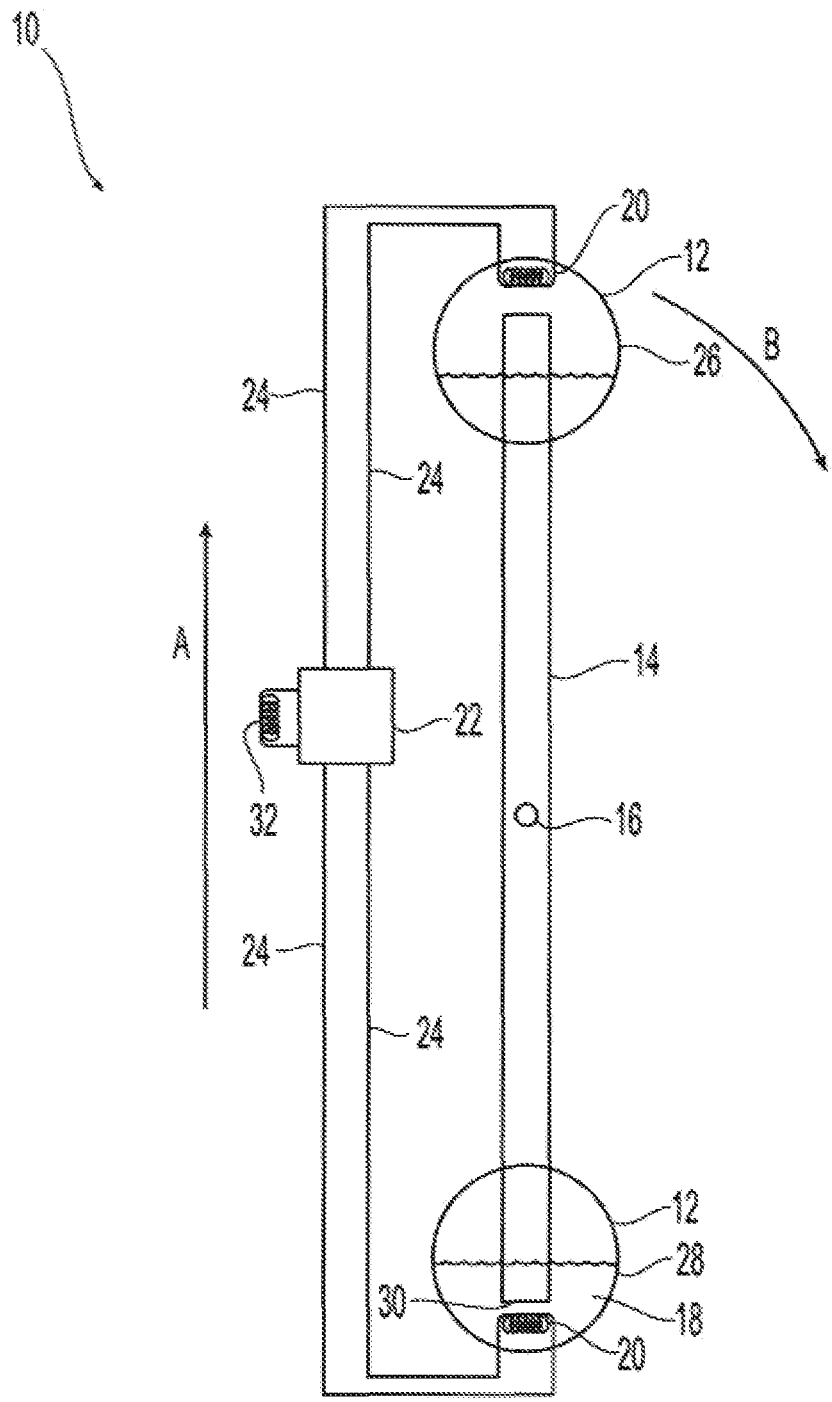
FIG. 1 is a schematic representation of an embodiment of an engine in accordance with the present invention.

Referring initially to FIG. 1, a schematic representation of an exemplary embodiment of an engine 10 in accordance with the present invention is illustrated. The engine includes at least two containers 12 arranged as a diametrically opposed pair. Running between the diametrically opposed pair of containers is at least one connecting arm 14. In addition, a tube is disposed between the two containers to provide a liquid connection between the containers. In one embodiment, the connecting arm and tube are formed as a single structure, i.e., an arm with a hollow central bore. In this embodiment, in addition to providing a fixed connection between the two containers, the connecting arm provides liquid or fluid communication between the containers in the pair. In one embodiment, one connecting tube is attached to each diametrically opposed pair such that each diametrically opposed pair is in fluid communication through the attached connecting tube; however, a plurality of tubes can be associated with any given pair of containers. Suitable materials for the tubes, connecting arms and containers are selected to be compatible with the liquids disposed within the tubes and containers and the pressures to which the tubes and containers are exposed. These materials include, but are not limited to, plastics, polymers, ceramics, metals and combinations thereof.

The containers and connecting tube or connecting arm form a sealed unit, and disposed within this unit is a quantity of a low-boiling point liquid 18. Suitable low boiling point liquids include, but are not limited to chlorofluorocarbons, hydrofluorocarbons, liquid ammonia, propane, carbon dioxide and butane. In general any suitable low boiling point liquid can be used. When the opposed pairs of containers are disposed in a vertical alignment having one container in an uppermost position 26 and one container in a lowermost position 28, a sufficient amount of low-boiling point liquid is disposed in the container in the lowermost position such that the end 30 of the connecting arm 14 and therefore the open end of the connecting tube is disposed below the surface of the fluid.

The engine also includes at least one active heat exchanger. The active heat exchanger includes heat exchange portions 20 disposed within each container. Each heat exchange portion is arranged as a coil, a series of fins or other arrangements to provide increased surface area for heat transfer within each container. In the lowermost container, the heat exchange portion is disposed at least partially within the low-boiling point liquid. In the uppermost container, the heat exchange portion is disposed within the gaseous area above the low-boiling point liquid. Each heat exchange portion is in communication through one or more connecting tubes 24 to a controller portion 22 of the active heat exchanger. The controller portion contains the necessary compressors, valves, including expansion valves, and control electronics to operate the active heat exchanger. The valves, compressors and control electronics can selectively use each heat exchange portion to move heat into or to extract heat from a given container. In one embodiment, a single, self-contained active heat exchanger is provided for each container. In another embodiment, a single control portion is provided for a plurality of opposed pairs of containers, and the single control portion is in communication with each heat exchange portion contained in one of the plurality of containers within the plurality of opposed pairs. In one embodiment, the active heat exchanger includes one or more additional heat exchange coils 32 in communication with the controller portion 22. These additional heat exchange coils are used to exchange heat between one or more of the containers and the ambient atmosphere. For example, two additional heat exchange coils can be provided, one for each of the two containers. Each one of the two additional heat exchange coils facilitates the exchange of heat between one of the containers and the ambient environment.

The control electronics within the controller portion are used to configure the compressor and valves to utilize the additional heat exchangers as desired to extract heat from or discharge heat into the ambient atmosphere.

In one embodiment, at least one active heat exchanger is provided in communication with each diametrically opposed pair of containers. The active heat exchanger is capable of transferring heat to or removing heat from the containers in each diametrically opposed pair. Alternatively, a plurality of active heat exchangers is provided such that each active heat exchanger is in communication with just one of the containers. In one embodiment, each paired set of containers has one associated active heat exchanger that includes a pump portion and an exchanger portion in communication with the pump portion through suitable piping and connections. For each paired set, the heat exchanger includes one pump and two exchanger portions. One exchanger portion is positioned in each container. Suitable exchanger portions include, but are not limited to, pipes, coils, radiators and arrangements of copper surfaces having increased surface area.

In operation, the active heat exchanger moves heat from the ambient atmosphere into the lowermost container through the heat exchange portion disposed within that container. In one embodiment, heat is also moved from the uppermost container using the heat exchange portion disposed within that container to either the ambient atmosphere, the lowermost container or both the ambient atmosphere and the lowermost container. Moving heat into the lowermost container introduces heat into the low-boiling point liquid in that container. This increases the vapor pressure above the liquid, moving liquid up through the connecting tube or arm in the direction of arrow A from the lowermost container to the uppermost container. As the uppermost container fills with liquid, its weight increases. Eventually, the weight in the uppermost container is sufficient to urge that container downwards, causing the opposed pair of containers to rotate about a central axis or rotating drive shaft 16 to which the arm is attached in the direction of arrow B. In one embodiment, relatively small amounts of heat are removed form the uppermost container during a given cycle, and a larger amount of heat is transferred into the lowermost container to affect the transfer of the low-boiling point working fluid from the lowermost container to the uppermost container.

In one embodiment, each paired, opposed and interconnected set of containers is one unit. The two containers in each paired set are connected by at least one tube or arm as illustrated in the FIG. 1. In one embodiment, the tube and arm are the same structure. Alternatively, the tube and arm form separate structures, for example an arm with a tube running along the length of the arm. Each tube allows the working fluid to pass between containers, for example, from the lowermost container to the uppermost container. The diameter of a given interconnecting tube is selected in accordance with Bernoulli's Theorem to optimize the flow of the low-boiling point liquid through the tube or connecting arm. In particular, the size of the tube is selected so as to accommodate the volume and flow of liquid there through. This diameter approaches in size that of the width or diameter of one of the containers.

Figure 2:
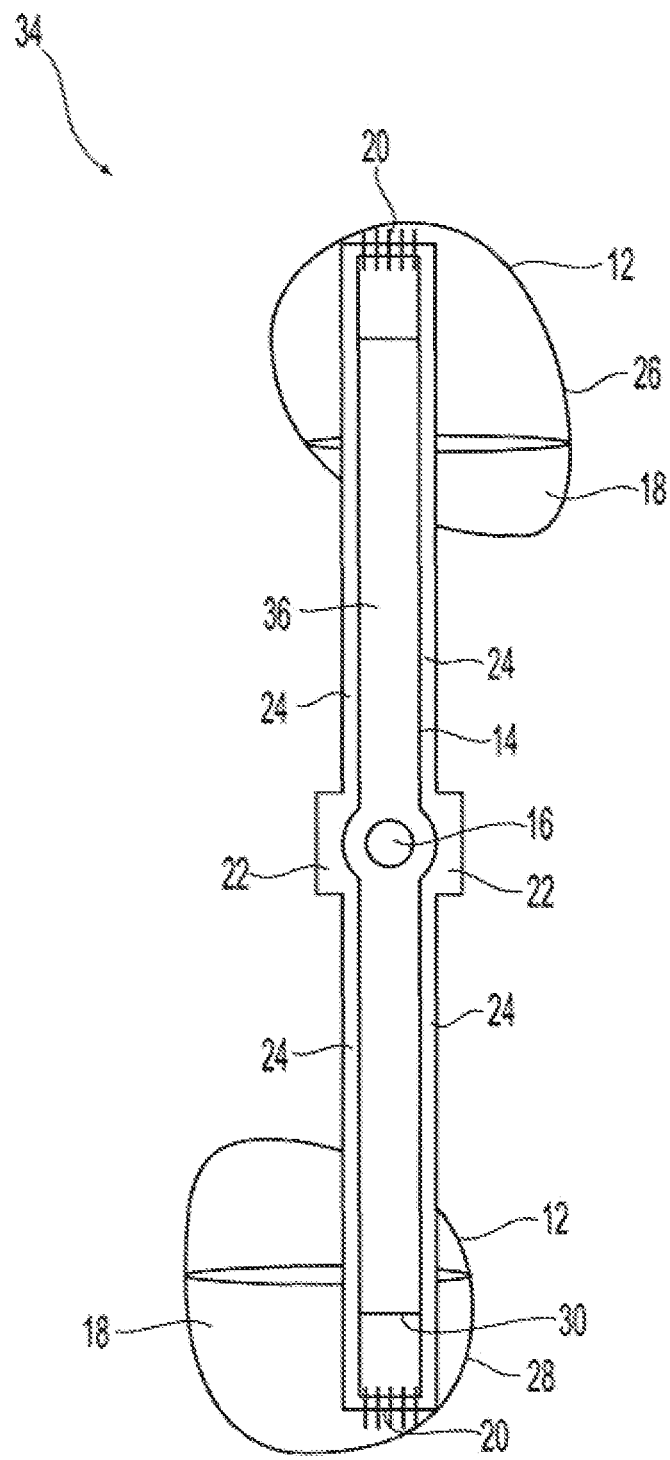
FIG. 2 is a view of another embodiment of the engine in accordance with the present invention.

Referring to FIG. 2, an exemplary embodiment of an engine 34 containing a single pair of containers in accordance with the present invention is illustrated. The containers 12 are illustrated in a vertical arrangement having a lowermost container 28 and an uppermost container 26. The connecting arm 14 between the containers includes a hollow interior 36 that functions as the tube between the containers. Therefore, the connecting arm and the tube are the same structure. The heat exchange portions 20 are disposed in each container, and the connecting tubes 24 run along the sides of the connecting arm 14 to the controller portion 22 of the active heat exchanger. As illustrated, the controller portion 22 is arranged as two separate portions disposed on either side of the middle of the connecting arm adjacent the drive shaft 16. This arrangement of connecting tubes and controller portions is balanced along the connecting arm to eliminate any undue moments about the drive shaft that could adversely affect the rotation of the pair of containers.

Suitable shapes for the containers include cylinders and spheres. However, as illustrated in FIG. 2, for example, each container is not disposed symmetrically about an end of the connecting arm, but is shaped to assist in the rotation of the containers about the central drive shaft. In particular, each container is arranged such that the liquid in the uppermost container is disposed to the side of the connecting arm in the direction of rotation. Therefore, as the liquid fills the uppermost container, the container is urged to fall or rotate in the desired direction. In one embodiment, the container is further shaped so that in the lowermost position, the liquid in the container is disposed substantially evenly about the connecting arm. This minimizes or eliminates moments about the connecting arm that would be induced by the liquid and that could inhibit the rotation of the containers about the central drive shaft. In one embodiment, each container, the connecting arm and connecting tubing are all insulated to prevent undesired heat transfer.

Although any desired size and shape of container can be used, in one embodiment, a plurality of containers are provided wherein each container is less than or equal to about 1 inch wide, and has a working radius of about 1 foot. In another embodiment, each container is about 20 inches wide with a work radius of about 1 foot. Therefore, for a given opposed pair of containers, the containers are spaced about 2 feet apart. In one embodiment, approximately 1 pound of working fluid is provided in each paired unit.

The connecting arm of each opposed pair of containers is connected to the central rotating drive shaft 16. The connecting arm and drive shaft are connected together so that as the arm rotates about the shaft, rotational motion is imparted to the shaft. In one embodiment, this connection is a fixed connection. Alternatively, the connection between the connecting arm and the rotating shaft is a ratcheted connection. For example the rotating shaft includes the gear wheel, and the connecting arm includes the pawl. In another embodiment, the connection between the connecting arm and the rotating shaft allows the uppermost container to rotate in substantially free fall during at least a portion of its rotation from the uppermost position to the lower most position. Therefore, the connecting arm would only engage the rotating shaft while the container passes from about 3 o'clock to about 6 o'clock. The connecting arm would similarly engage the rotating shaft when the second container rotates from the uppermost position to the lowermost position. Any suitable connection between the connecting arm and the rotating shaft can be used, including arrangements where the connecting arm and rotating shaft rotate concentrically. Alternatively, the connecting arm and rotating shaft rotate about separate axes.

Figure 3:
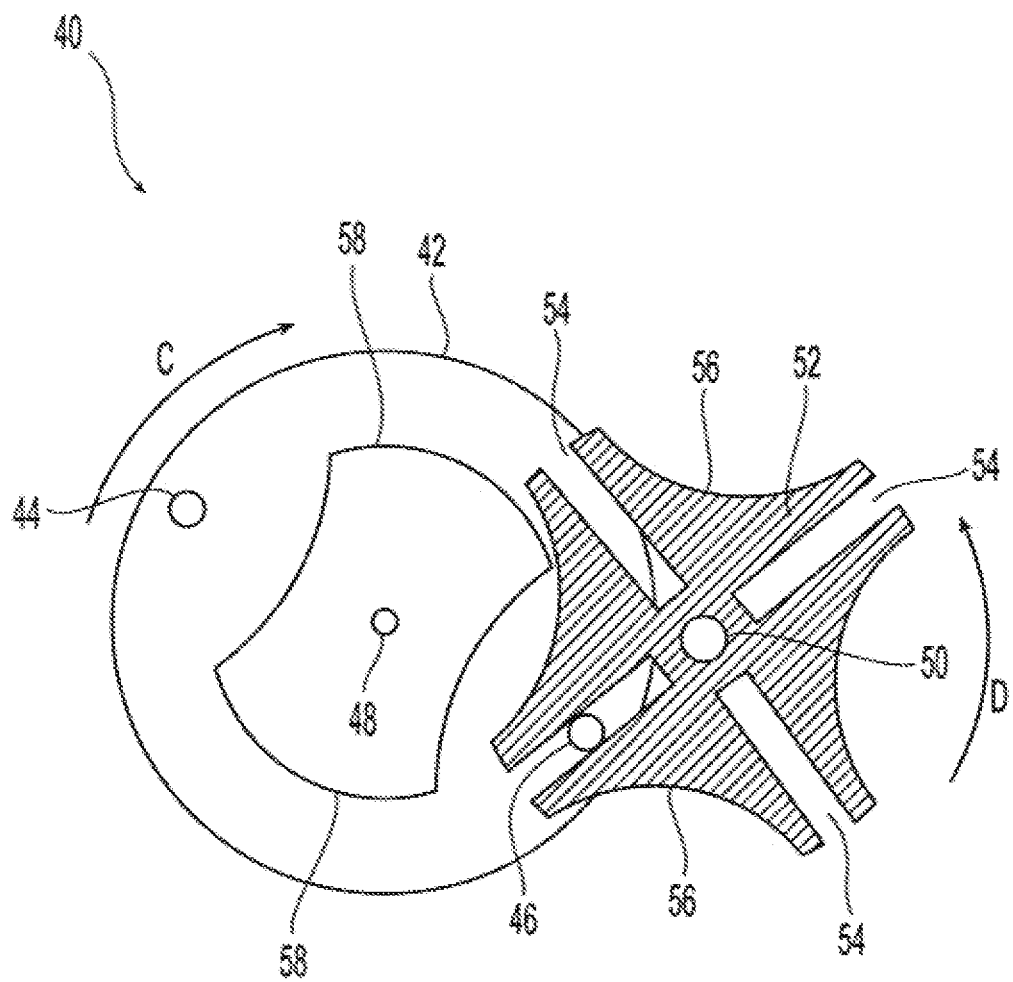
FIG. 3 is a view of an embodiment of a connection mechanism between an arm and a shaft about which the arm rotates.

In order to provide rotational engagement between the arm and the shaft, each arm includes a first part of a two-part rotating connection, and the shaft includes a corresponding second part of the two-part rotating connection in contact with the first part. Referring to FIG. 3, an exemplary embodiment of a two-part connection 40 between the connecting arm and the rotating shaft is illustrated. In accordance with this embodiment, the connecting arm includes or is connected to a first rotating connection part 42 that rotates about a first axis

48. The first rotating connection part includes a first post 44 and a second post 46 extending from the surface. The rotating shaft includes or is connected to a second rotating connection part 52 that rotates about a second axis 50. The first axis 48 is parallel to but spaced from the second axis 50. As the first rotating connection part 42 rotates in the direction of arrow C, the second rotating connection part is not rotating, and one of the first and second posts enters one of a plurality of radial slots 54 disposed in the second rotating connection part. The post travels into the slot and engages one of the sides or bottom of the slot, causing the second rotating connection part to rotate in the direction of arrow D. Since the second rotating connection part is attached to the rotating shaft, rotation of the second rotation connection part rotates the shaft. The second rotating connection part continues to rotate until the slot is positioned such that the post passes out of the slot. The second rotating connection part then stops rotating, and the first rotating connection part can continue to rotate. In one embodiment, the posts are positioned about the first rotating connection so that engagement of the posts in the slots corresponds to movement of the uppermost container from the 3 o'clock position to the 6 o'clock position. The second rotating connection part can include a plurality of concave surfaces 56 that correspond to convex surfaces 58 on the first rotating connection. This arrangement permits relative rotation between a rotating first connection part and a stationary second connection part. The first and second connections can be in direct contact with the connecting arm and rotating shaft or are connected through one or more gear, arms or clutch mechanisms. Permitting free fall during a portion of the rotation provides for the capture of as much energy as possible as the uppermost container moves into the lowermost position under the force of gravity.

In another embodiment, a controllable pneumatic engagement system is used. In this embodiment, a pneumatic or air driven post disposed in the rotating shaft moves outward, for example radially, from the shaft and engages a corresponding hole in the arm. Once engaged, the arm and shaft rotate together. The post would be controlled to engage the arm in the 3 o'clock position and disengage the arm in the 6 o'clock position. Other pneumatic embodiments would use a friction system, for example as found in air brakes, to selectively engage the rotating shaft and the arm.

Figure 4:
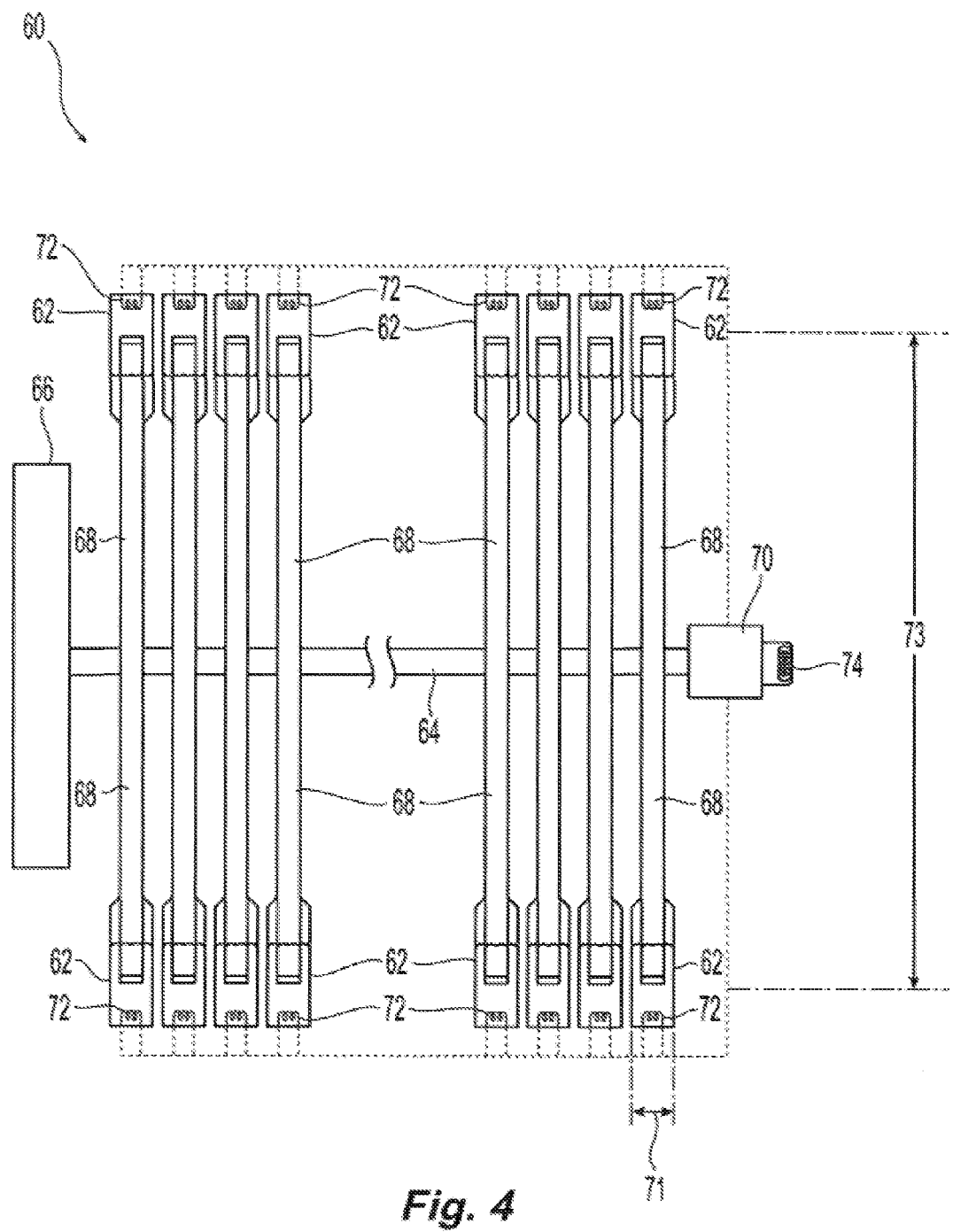
FIG. 4 is a schematic representation of an embodiment of an engine containing an array of paired containers.

In one embodiment, the engine includes a single pair of opposed containers connected to an arm that is connected to the rotating shaft. In other embodiments, two or more opposed pairs of containers are connected to a common rotating shaft. Referring to FIG. 4, an exemplary embodiment of an engine 60 in accordance with the present invention that includes a plurality of containers 62 arranged as a plurality of opposed pairs of containers spaced along the length of a common rotating shaft 64 is illustrated. In one embodiment, the plurality of paired containers forms a circular arrangement of containers that is a coplanar arrangement aligned in a vertical plane and having a central hub around which all the containers in the circle rotate. For a given diametrically opposed pair of containers, each container in that pair oscillates or alternates between an uppermost position and a lowermost position. When in substantially the lowermost position, a given container is in communication with the source of heat from the active heat exchanger, and when in the uppermost position, the container is in communication with the sink of heat from the active heat exchanger.

As illustrated, the common rotatable shaft 64 has a given length, and the plurality of containers associated in pairs is spaced along this length of rotatable shaft. Each pair of containers is in communication with the shaft and can rotate about the shaft in a distinct plane that is substantially perpendicular to the shaft. Preferably, each pair of containers rotates in a separate plane, and all of the planes are substantially parallel to one another. The container pairs are in communication with the shaft such that as the pairs rotate about the shaft, the rotational motion or momentum from the containers is imparted to the shaft as rotational motion. Suitable methods for connecting each pair to the shaft to impart rotational motion are the same as discussed above for the single pair of containers. Preferably, each pair of containers rotates about the shaft independently of the other pairs of containers. Therefore, the different pairs can rotate simultaneously and at different speeds. In one embodiment, the rotating shaft 60 is in communication with a flywheel 66. The shaft imparts rotational movement to the flywheel when the shaft is spinning faster than the flywheel. Suitable arrangements of flywheels are known and available in the art. The flywheel maintains this rotational motion, which is communicated to one or more devices either directly of through an arrangement of gears and transmissions. Alternatively, the rotating shaft is directly connected to a device for harnessing the rotational motion of the shaft. In another embodiment, the engine includes a transmission that is in communication with the shaft and that is capable of modifying at least one of a rotational speed and a torque received from the shaft. These devices convert the rotational motion into the desired electrical work, e.g., producing an electrical current or charging batteries, or mechanical work.

As the pairs are spaced along the shaft, the engine forms an array of paired, rotating containers. The length and size of the array can be varied depending upon the engine application. In one embodiment for a mobile installation as would be used in a moving vehicle, each pair of containers is connected by an arm that has an overall length 73 of about 2 feet, and each container in the pair has a width 71 of about 1 inch measured in a direction parallel to the shaft. A single array or banks of multiple arrays can be used in a given installation. For a moving vehicle, approximately 6 feet wide and 10 feet long, three 10 foot long arrays can be used. In another embodiment, three arrays of 10 pound containers are provided. Again, the containers in a given pair are connected by a 2 foot long arm. In each array, ten pairs are spaced along the axis. Each container has a width 71 of about 20 inches wide measured along the direction of the rotating shaft. These arrays can be combined with flywheels to provide 600 foot pounds of work per unit of time. The work produced can be used directly for vehicle propulsion or for ancillary functions, for example to create hydraulic pressure, to produce hydrogen that would be stored for later use in fuel cells to power the vehicle or to charge an array of batteries.

In one embodiment, each pair of containers in the engine includes the connecting arm 68 attached to both containers in the pair such that each container in the pair is disposed on either end of the arm. Therefore, the engine includes a plurality of arms 68, one each for the plurality of container pairs, and each arm is in rotatable contact with the shaft 64 at a point along the arm 68 between the two containers. In order to impart rotational motion to the shaft, the arm is arranged to engage the shaft as the arm rotates about the shaft. In one embodiment, the arm is fixed to the shaft, and both the arm and the shaft rotate together during an entire rotation. In another embodiment, the arm engages the shaft only during a portion of the rotation. At other points in the rotation, the arm spins free of the shaft. Suitable arrangements for the connection between each arm and the shaft are discussed above. In one embodiment, each arm further includes a first part of a two-part ratchet connection, and the shaft includes corresponding second parts of the two-part ratchet connection, one second part for each arm in communication with the shaft. In one embodiment, the engine also includes a plurality of connecting tubes. Each connecting tube is attached to a given pair of containers such that the containers in the pair are in fluid communication through the attached connecting tube. As illustrated, each connecting arm and connecting tube is formed as a single unit. Each pair of containers and the associated connecting tube contain a volume of the low boiling point liquid. This liquid moves between the containers in that pair through the attached connecting tube when the containers are exposed to a temperature differential.

In order to achieve this heat differential, at least one heat exchange portion 72 is provided in each container. In one embodiment, these heat exchange portions are all in communication with a single, centralized controller portion 70 of the active heat exchanger. The centralized controller portion 70 directs either heated or cooled refrigerant to each heat exchanger as desired to achieve heating and cooling in the containers. The centralized controller portion 70 is also in communication with one or more additional heat exchange coils 74 for exchanging heat with the ambient environment. The active heat exchanger is capable of transferring heat to or removing heat from the containers in each pair of containers. In one embodiment, the active heat exchanger is a heat pump. In one embodiment, each container is associated with its own heat pump, for example, a heat pump of sufficient size to raise or lower the temperature of the container and the liquid or gas within the container by a desired amount within a prescribed period of time. In one embodiment, each pair of containers is associated with its own active heat exchanger.

In one embodiment, each paired set of containers rotates about the central shaft independent of the rotation of the other paired sets. Each paired set of containers engages the rotating central shaft through at least a portion of the rotation, for example as a given container moves from the uppermost position to the lower most position. In one embodiment, each paired set of containers is free to rotate at any time once the uppermost container receives a sufficient amount of the low-boiling point liquid. In another embodiment, the plurality of paired containers is operated as a timed array in a serial, linear fashion. This array is timed in that the timing of the falling of each filled uppermost container is timed or controlled to achieve optimum or maximum energy recapture.

Since each one of the plurality of pairs preferably rotates about the shaft independent of the rotation of the other pairs, in one embodiment, the engine includes a control mechanism (not shown) for synchronizing or timing the rotation of the pairs of containers about the shaft. In particular, the control mechanism prevents or inhibits a container in the uppermost position and having a sufficient amount of liquid from moving or rotating to the lowermost position. Suitable control mechanisms include, but are not limited to, electromagnets mounted on the container or along the length of each connecting arm, mechanical holders that grasp each arm and can be controlled to release the arm and braking systems that are mounted along the shaft for example in the connection between the shaft and each arm. The control mechanism also includes a logic control unit to control the release of each pair of containers in response to one or more predefined conditions such as the expiration of a given period of time or the rotational speed of the shaft or flywheel. Suitable control mechanisms are components known and available in the art.

Therefore, the plurality of container pairs forms a timed array in combination with the shaft. In one embodiment, where the planes in which each pair of containers rotates are substantially vertical, and the containers can oscillate between an uppermost position and a lowermost position, such that when moving from the uppermost position to the lower most position, each container is capable of free falling at least a portion of the distance between the uppermost position and the lowermost position, the control mechanism times when a given container can begin a free fall from its uppermost position to its lowermost position. In one embodiment, sensors are used to determine when a given container in the uppermost position is sufficiently full of liquid. The full container can then be released based upon time or the rotational speed of the rotatable shaft or flywheel. In one embodiment, the logic control unit uses algorithms that use the temperature of the ambient air as a variable for determining how fast the upper container will fill with fluid and that calculate the maximum energy recapture based on the availability of filled containers in the uppermost position and the release intervals of the available containers.

In one embodiment, a plurality of 20 pound containers each having a width of about 20 inches and disposed in pairs having a connecting arm with a length 73 of about 5 feet are disposed along an axel that is about 20 feet long. Each row of paired containers can generate 1000 foot pounds of force. With three parallel rows arranged in five stacks, a total of 15,000 foot pounds are possible. An embodiment of 60 foot long axels arranged in nine axel rows and fifteen rows stacks will produce 405,000 foot pounds of force. In one embodiment, heat is obtained directly from the ambient atmosphere and used to generate electricity and motion without the production of combustion by-products such as $CO_2$ and other pollutants.

In one embodiment, a supplementary source of heat is provided in communication with the active heat exchangers. This supplementary source of heat, for example constructed from an insulated container that holds a quantity of a water soluble polyvalent metal salt in a dehydrated or partially dehydrated stated, is configured to release heat to the active heat exchangers when rehydrated in a controlled fashion by allowing water to hydrate the polyvalent metal salt within the container and, thus, releasing its heat of hydration. In particular, the supplementary heat source is in communication with the additional heat exchange coils of the active heat exchangers. Therefore, the heat produced by the supplementary heat source is transferred into one or more of the containers in the engine. In one embodiment, the supplementary source of heat can also act as a heat sink to accept waste heat transferred out of one or more of the containers of the engine. Suitable supplementary heat sources are described in U.S. Pat. Nos. 4,403,643 and 4,291,755. The entire disclosures of these references are incorporated herein by reference. In general, the polyvalent metal salt or combination of salts within the containers is selected to have a high heat of hydration. These polyvalent metal salts include the halide or sulfate salts of a divalent or trivalent metal and mixtures thereof. Examples of suitable polyvalent metal salts include, but are not limited to, aluminum fluoride, aluminum chloride, beryllium chloride, magnesium chloride, aluminum bromide, aluminum sulfate, ferric chloride, magnesium sulfate, calcium chloride, zinc chloride and combinations thereof.

In one embodiment, the mixture of polyvalent metal salts of the supplementary heat source is provided in a generally dehydrated state. The supplementary heat source can be provided as a portable block or brick, for example held within an insulated container that can be easily removed or replaced once the heat source is depleted. Any suitable arrangement of the polyvalent metal salts that is suitable to work in conjunction with the heat exchanger portions of the engine can be used. The dehydrated polyvalent metals salts are then exposed to a source of moisture. In one embodiment, the moisture is derived from the relative humidity of the ambient atmosphere, for example by using a fan to circulate air over the material. Alternatively, a source of water is provided to hydrate the polyvalent metal salts. Upon the addition of moisture or water to the polyvalent metal salts to effect hydration, heat is evolved, and this heat is transferred to one or more of the containers in the engine.

As used herein, the "containers in the engine" refer to a heat box or furnace in which heat is evolved via rehydration of the material, itself confined within a separate container, and this heat is actively transferred into the embodiments of the engine or generator herein described. Various configurations of containers arranged to contain, transport and store the zeolite or polyvalent metal salts are implied so as to keep that material air tight in its dehydrated energy storage form until such time as it is rehydrated in a controlled fashion and heat is released into the container or containers in the engine described variously as a furnace or heat box. These storage containers that can be alternately placed into and removed from the heat box or furnace containers can be dehydrated when ambient heat energy is available, as during the summer months, stored, and then used in embodiment of the engine or generator of the present invention as a heat or energy source to heat a house or other place or building, to provide power to a structure or dwelling, as a mode of ground or water transportation, e.g. car, truck, boat or ship, or for other similar or analogous uses.

Since the water used for hydration is reversibly removable, heat directed into one of the above-described containers can be used to remove water from the polyvalent metals salts. Alternatively, a container of these salts can be rehydrated to release heat and then removed from immediate juxtaposition with the heat exchangers and moved to another location, storage area or storage facility, and at some later time, another source of energy, for example the common electrical power grid can be used to dehydrate the salts in the container once again, thus, storing energy for future use through the above described process of adding water or moisture to the now dehydrated water soluble polyvalent metal salt or salts. When water is released from the system by dehydrating the contained salt or salts, the removed water can be recaptured and used, for example, for subsequent hydration or any other function desired. The temperature at which the heat is liberated from the salt is a function of the rate at which the polyvalent metal salts are rehydrated and the rate at which heat is transferred to the containers. The rehydration process is similarly influenced by the temperature and pressure factors that determine dehydration, but in the opposite sense. Thus, the higher the pressure of water vapor, the higher the rate of rehydration and the higher the temperature attainable.

Figure 5:
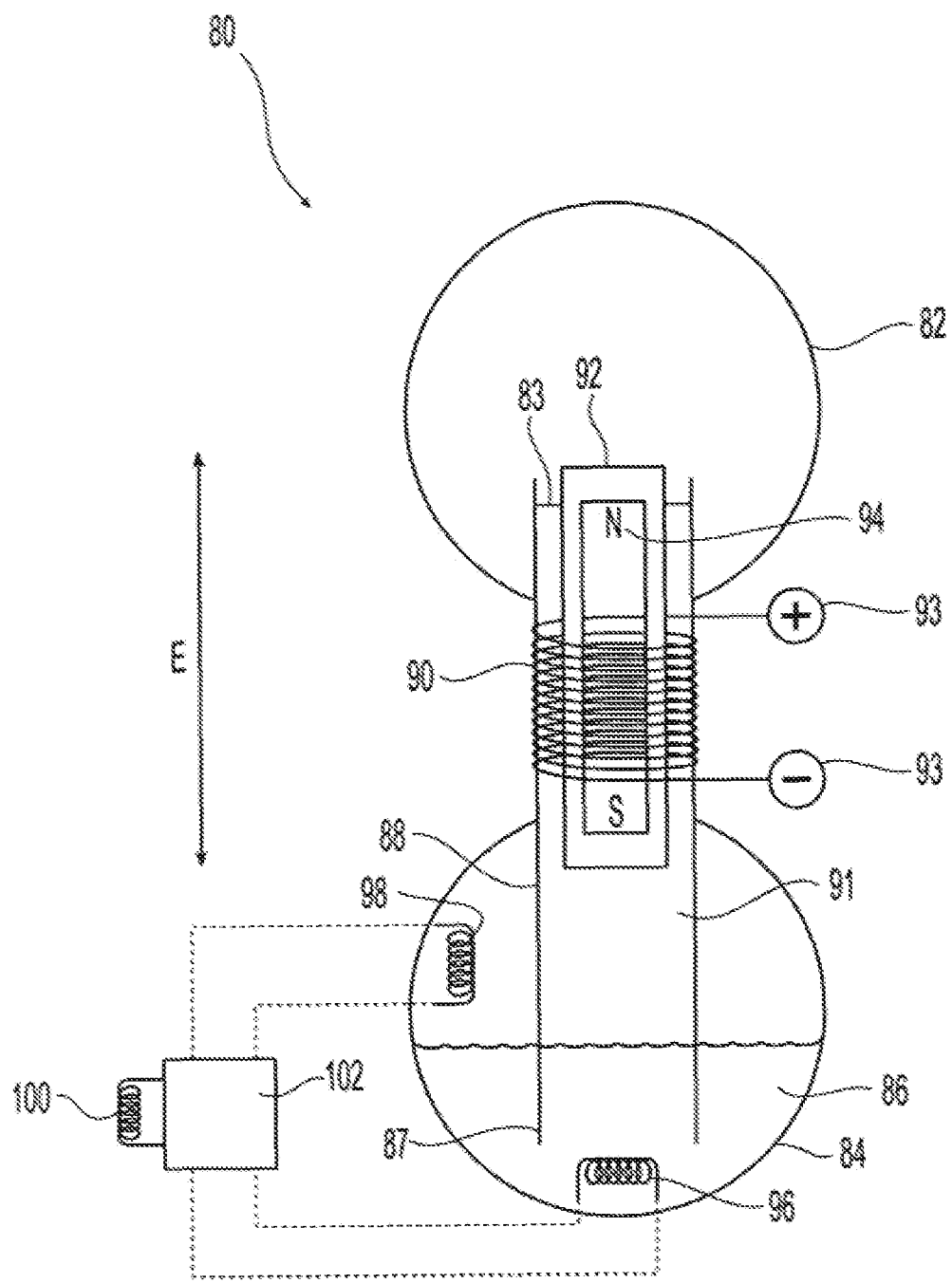
FIG. 5 is a schematic representation of another embodiment of an engine in accordance with the present invention.

Referring to FIG. 5, in one exemplary embodiment of the present invention, the engine is arranged as an electrical generator 80 that produces electrical energy. The generator 80 includes a first container 84 located in a bottom or lowermost position and a second container 82 located in a top or uppermost position. The first and second containers are fixedly secured together and brought into fluid contact through a connecting arm 88 that includes a central tube or hollow bore 91. In one embodiment, the top container is larger in volume than the lower container to minimize compression backpressure. Preferably, the top container has a volume sufficient to permit expansion of the gas phase of the low boiling point liquid in the lower container. Disposed within the first container is a quantity of the low-boiling point liquid 86. A sufficient amount of liquid is disposed in the first container such that the open end 87 of the connecting arm that is disposed in the first container is always located below the surface level of the liquid. Therefore, during all cycles of the engine, the open end of the connecting arm is below the surface of the liquid. Located within the central bore of the connecting arm is a flotation collar 92 encasing a permanent magnet 94. The flotation collar is made of a material that will float in and is compatible with the low-boiling point liquid. In one embodiment, the flotation collar can also include a flexible collar or flange 83 that forms a relatively gas tight or water tight seal between the flotation collar and the sides of the connecting arm. This tight seal, however, is not needed for floating but is used to minimize the distance from the flotation collar to the sides of the connecting arm or tube to minimize friction. A sufficient amount of the flotation collar material is included to float the permanent magnet. In one embodiment, the magnet is round or spherical and hollow, for example, a solid surface hollow sphere constructed from two halves that joined together, obviating the need for a flotation collar. The poles of the permanent magnet are aligned vertically. A wire coil 90 is wound around the exterior of the connecting arm between the first and second containers. Suitable wire for the wire coil includes copper wire. Electrical leads or connections 93 are disposed on either end of the wire coil. These leads are connected to an electrical load, e.g., a battery or motor, as desired.

A first heat exchanger portion 96 of an active heat exchanger is disposed within the first container in contact with the low-boiling point liquid. A second heat exchanger portion 98 is also disposed in the first container in the space above the liquid. The first and second heat exchanger portions are in contact with a controller portion 102 that contains pumps, valves and electronics to control the operation of the active heat exchanger. One or more additional heat exchanger portions 100 are provided in contact with the controller portion. These additional heat exchanger portions provide for the transfer of heat between the containers and the ambient environment. The operation of the active heat exchanger is the same as the active heat exchangers discussed above, and the active heat exchanger transfers heat into and out of the first container.

The engine or generator 80 utilizes the active heat exchanger to extract heat from the ambient environment. The active heat exchanger, for example a heat pump, consumes one unit of electrical energy to transfer 3, 4 or 5 units of heat energy. The inputted energy in the form of heat is introduced into the first container through at least one of the first and second heat exchanger portions. The introduction of heat energy into the first container increases the vapor pressure above the low-boiling point liquid in the bottom or lowermost container, forcing the liquid up through the connecting tube in the direction of the top or uppermost container, which acts as an expansion chamber. The rising level of liquid in the tube floats or pushes the magnet through the tube and through the wire windings. The first container is then allowed to cool either passively or through the use of at least one of the first and second heat exchanger portions. When then first container is cooled, for example by a few degrees, the vapor pressure above the liquid in the first container will decrease. The level of fluid in the tube will fall down through the connecting arm, and the magnet will also fall back through the tube and the wire windings. This process of heating and cooling is continued, and the magnet oscillates up and down through the tube and wire windings in the direction as indicated by arrow E. The vertical oscillation of a fixed magnet through the wire coil induces a current in the windings that is communicated to the leads and the loads attached to those leads.

Figure 6:
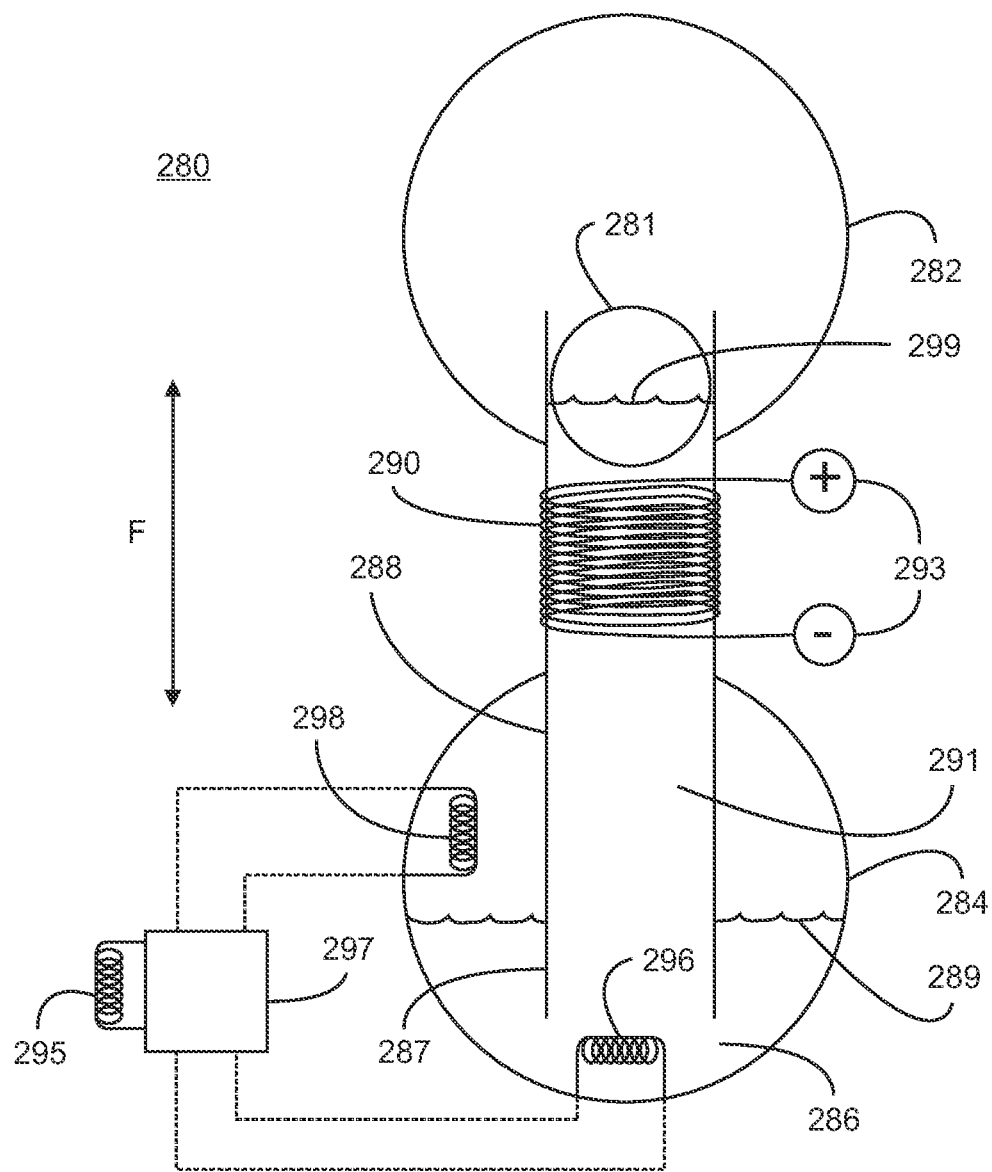
FIG. 6 is a schematic representation of yet another embodiment of an engine in accordance with the present invention.

Referring to FIG. 6, an embodiment of the reciprocating electrical generator 280 is illustrated that utilizes a spherical magnet 281. This generator 280 includes a first container 284 located in a bottom or lowermost position and a second container 282 located in a top or uppermost position. The first and second containers are fixedly secured together and brought into fluid contact through a connecting arm 288 that includes a central tube or hollow bore 291. In one embodiment, the top container is larger in volume than the lower container to minimize compression backpressure. Preferably, the top container has a volume sufficient to permit expansion of the gas phase of the low boiling point liquid in the lower container. Disposed within the first container is a quantity of the low-boiling point liquid 286. A sufficient amount of liquid is disposed in the first container such that the open end 287 of the connecting arm that is disposed in the first container is always located below the surface level 289 of the liquid in the first container 284. Therefore, during all cycles of the engine, the open end of the connecting arm is below the surface of the liquid.

The spherical magnet 281 is located within the central bore 291 of the connecting arm 288 and is buoyant. In one embodiment, the spherical magnet 281 includes a buoyant material that is compatible with the low-boiling point liquid. Alternatively, the spherical magnet 281 is a hollow sphere. In one embodiment, the spherical magnet has a polarity that is aligned about the equator of the sphere. Therefore, the top of the sphere is one pole, and the bottom of the sphere is the opposite pole. Preferably, the spherical magnet is constructed to provide a uniform polarity across the entire surface of the sphere. Therefore, the entire outer surface of the sphere is a first pole, and the entire inner surface of the sphere is a second pole that is magnetically opposite the first pole. The hollow spherical magnet is implied to include various configurations as described herein. In one embodiment, the hollow spherical magnet includes two bowl-shaped magnets, each separately having opposite polarities respectively with regard to its concave and convex surfaces. When the two solid bowl-shaped magnets are fastened together, a hollow spherical magnet is formed, with opposite polarities. One polarity is distributed over the inner surface of the sphere, and the opposite polarity is distributed over the outer surface of the sphere. In another embodiment, the hollow spherical magnet is configured to include a plurality of individual magnets juxtaposed with perimeter margins immediately contiguous or individually separated by a dielectric matrix such that a hollow airtight sphere is formed with opposite inner and outer polarities.

Figure 7:
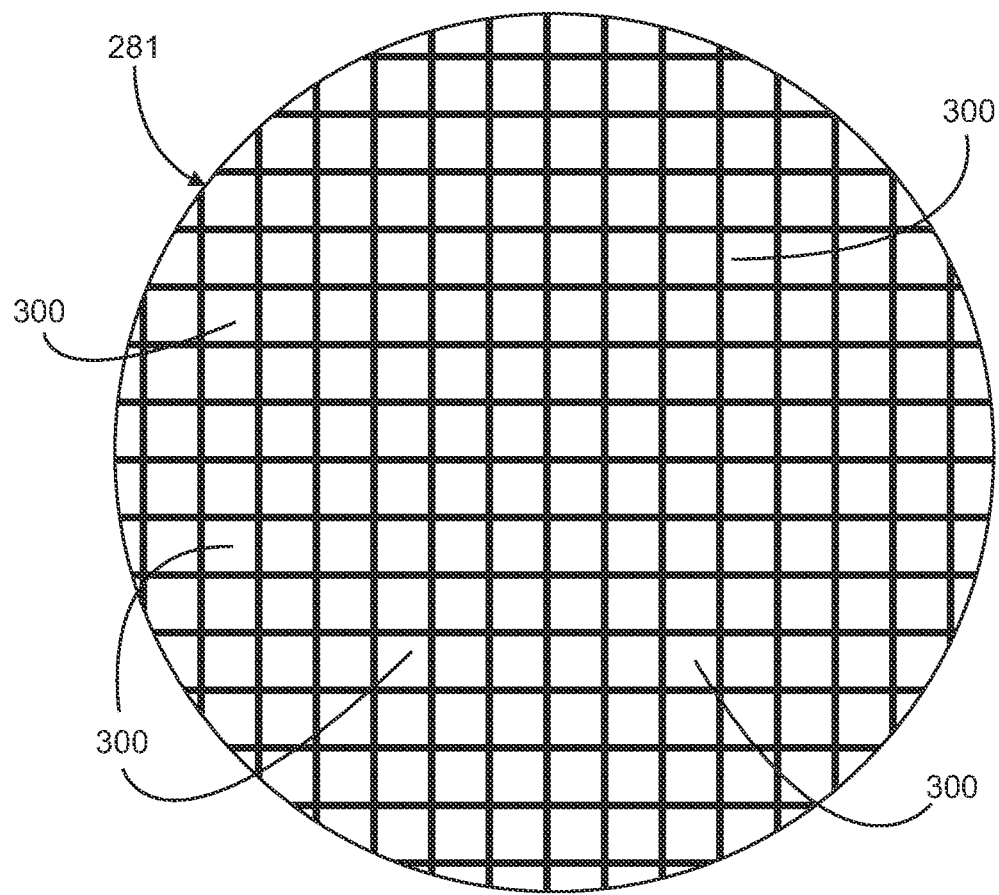
FIG. 7 is a schematic representation of an embodiment of a spherical magnet for use in an engine in accordance with the present invention.
Figure 8:
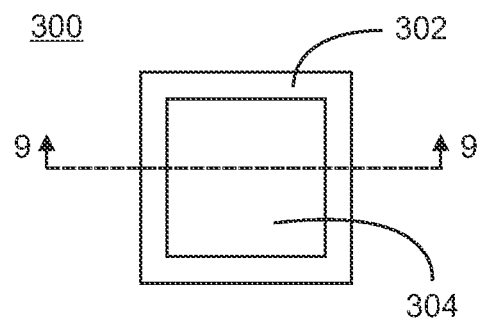
FIG. 8 is a schematic representation of an embodiment of an individual plate magnet for use in the spherical magnet of FIG. 7.
Figure 9:
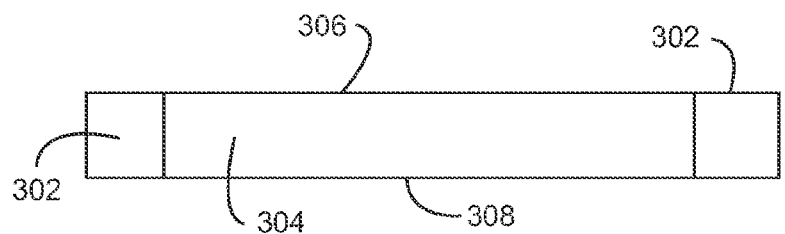
FIG. 9 is a view through line 9-9 of FIG. 8.

Referring to FIGS. 7-9, an exemplary embodiment of a hollow spherical magnet 281 in accordance with the present invention is illustrated. Although illustrated as a hollow spherical magnet, other suitable shapes can be used for the hollow magnet including a hollow elliptical magnet, a hollow cylindrical magnet and a hollow conical magnet. All of the disclosure pertaining to the hollow spherical magnet is applicable to other magnet geometries.

As illustrated, the hollow spherical magnet is constructed from a plurality of individual magnets 300 that are arranged to form the outer layer of the sphere. In one embodiment, each individual magnet is shaped like a wedge having an outer surface with a curvature suitable for the surface of the sphere. These individual wedge pieces fit together to form the sphere. Preferably, each individual magnet 300 is a flat or plate magnet that is shaped to a curvature suitable for the surface of the sphere. Each individual magnet 300 represents a generally rectangular or square section of the surface of the sphere, and the individual rectangles are two-dimensional rectangular plates that are placed together with their sides touching. The individual magnets 300 are placed together so that the outer layer of the sphere forms a fluid tight surface. Suitable methods for joining the magnets together include using adhesives such as glues or epoxies. The size of the individual magnets 300 can be varied as desired. In addition, the total number of magnets in the spherical magnet can be varied from 2 or 4 magnets to larger numbers of magnets.

Two or more of the individual magnets can be arranged on the surface of the sphere so that the sides that are touching are edges of the actual plate magnets. Therefore, groupings of individual magnets along the surface of the sphere form larger magnets that constitute a spherical section. Preferably, a separate non-magnet material is provided between adjacent edges of some of or all of the edges of the individual magnets. For example, the non-magnetic material can be provided between edges so that two lines of non-magnetic material are provided that divide the sphere into for equal areas, each area having at least one and preferably a grouping of individual magnets. Additional non-magnetic material between the edges can be provided until all of the edges between adjacent individual magnets are spaced apart by non-magnet material. Even though non-magnet material is used, the surface of the sphere remains fluid tight. The center of the sphere is hollow or may contain a buoyant material such as wood or polystyrene.

In one embodiment as is shown in FIG. 8, each individual magnet 300 includes a central magnet portion 304 and an outer portion 302. The outer portion extends around all of the edges of the central magnet portion and is preferably of a uniform thickness. As shown in FIG. 9, each central magnet portion has a first face 306 with a first magnetic polarity and a second face 308 opposite the first surface and having a second opposite magnetic polarity. Therefore, each individual magnet is arranged with its first face on the outer surface of the sphere and its second surface on the inner surface of the sphere. The polarities are configured and arranged so that the entire outer surface of the spherical surface presents a single pole and the internal spherical surface present the opposite magnetic pole. Alternatively, the individual magnets of the spherical magnet can be arranged so that a vertical polarity is achieved on the surface of the sphere.

The outer portion 302 is formed from an insulating or dielectric material. The width of the outer portion is selected so that adjacent individual magnets are spaced sufficiently apart so that the magnetic field lines of adjacent magnets do not adversely interfere. In one embodiment, the outer surface of the sphere is coated with a lubricating or friction reducing coating, for example a thin polymer of tetrafluoroethylene fluorocarbon (polytetrafluoroethylene [PTFE]), which is commercially available under the tradename Teflon® from E. I. du Pont de Nemours and Company of Wilmington, Del., to minimize the friction of the sphere as it moves through the bore of the connecting arm.

In one embodiment, the diameter of the spherical magnet is selected to provide a sufficiently tight fit with the bore of the connecting arm to minimize unwanted lateral movement of the sphere while avoiding undesired drag on the bore. Returning to FIG. 6, a wire coil 290 is wound around the exterior of the connecting arm 288 between the first and second containers. Suitable wire for the wire coil includes copper wire. Electrical leads or connections 293 are disposed on either end of the wire coil. These leads are connected to an electrical load, e.g., a battery or motor, as desired.

A first heat exchanger portion 296 of an active heat exchanger is disposed within the first container 284 in contact with the low-boiling point liquid 286. A second heat exchanger portion 298 is also disposed in the first container 284 in the space above the liquid. The first and second heat exchanger portions are in contact with a controller portion 297 that contains pumps, valves and electronics to control the operation of the active heat exchanger. One or more additional heat exchanger portions 295 are provided in contact with the controller portion. These additional heat exchanger portions provide for the transfer of heat between the containers and the ambient environment. The operation of the active heat exchanger is the same as the active heat exchangers discussed above, and the active heat exchanger transfers heat into and out of the first container.

The engine 280 utilizes the active heat exchanger to extract heat from the ambient environment. The active heat exchanger, for example a heat pump, consumes one unit of electrical energy to transfer 3, 4 or 5 units of heat energy. The inputted energy in the form of heat is introduced into the first container through at least one of the first and second heat exchanger portions. The introduction of heat energy into the first container increases the vapor pressure above the low-boiling point liquid in the bottom or lowermost container, forcing the liquid up through the connecting tube in the direction of the top or uppermost container, which acts as an expansion chamber. The rising level of liquid in the tube 299 floats or pushes the spherical magnet 281 through the tube and through the wire windings. The first container is then allowed to cool either passively or through the use of at least one of the first and second heat exchanger portions. When the first container is cooled, for example by a few degrees, the vapor pressure above the liquid in the first container will decrease. The level of fluid in the tube will fall down through the connecting arm, and the spherical magnet will also fall back through the tube and the wire windings. This process of heating and cooling is continued, and the magnet oscillates up and down through the tube and wire windings in the direction as indicated by arrow F. The vertical oscillation of a fixed magnet through the wire coil induces a current in the windings that is communicated to the leads and the loads attached to those leads.

In one embodiment, oscillation of the magnet, including the spherical magnet is enhanced by providing a biasing member between the magnet and the first container 284. This biasing member biases the magnet downwards into the first container and assists in the downward movement of the magnet when the level of the fluid in the connecting arm drops. At the top of the cycle when the magnet is at its top most position, heat is removed from the system, and the meniscus between the gas and liquid phase of the working fluid in the connecting arm descend. The decent of the working fluid can be faster than the decent of the magnet. The biasing member provides additional force to bring the magnet through the coil at a faster rate.

Suitable biasing members include springs that are attached between the magnet and the first container, weights attached to the magnet, expandable or deformable bladders or baffles that create back-pressure on the magnet and low boiling point working fluid, a ballast drag element and combinations thereof. In one embodiment, the spring constant of the biasing spring is chosen so as not to interfere with the upward motion of the floating magnet. Preferably, the biasing member is a ballast drag element. In one embodiment, the ballast drag element has a specific gravity that is very close to or substantially the same as the working fluid. Therefore, the ballast drag element when attached to the magnet would not add appreciable weight to the magnet as the magnet floats upward. However, an additional constant force is applied to the magnet as the magnet falls down through the connecting arm. In another embodiment, the specific gravity of the ballast drag element and the contents of the ballast drag element can be greater than that of the working fluid so as to increase the mass or weight of the ballast drag element and to provide a greater downward force on the floating magnet. This increase in mass will be less than an amount required to offset of cancel the buoyant force of the floating magnet when combined with other forces that inhibit passage of the magnet up through the coil such as drag or frictional forces between the magnet and other surfaces.

Figure 10:
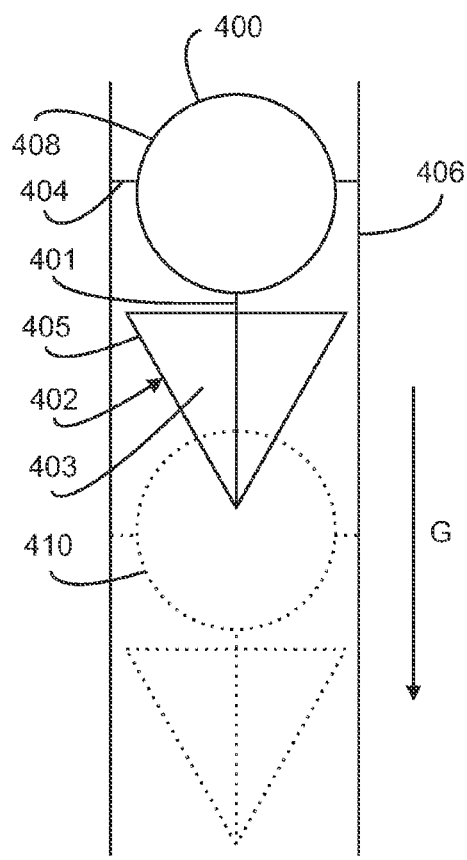
FIG. 10 is a schematic representation of an embodiment of a ballast drag biasing member for use in an engine in accordance with the present invention.

As illustrated in FIG. 10, the spherical magnet 400 is attached through a tether 401 to a ballast drag element 402 having a conical shape. The ballast drag element includes a hollow interior 403 that is filled with the working fluid and sides 405 that are formed of a thin material, for example a metal or plastic. The ballast drag element can have an open top, a closed top or holes in the top, sides or bottom. The sides are formed so as to add as little weight as possible and can be selected to have a specific gravity as close as possible to the working fluid. In a first upper position 408, the spherical magnet 400 floats on the surface of the working fluid 404 that has risen up through the connecting arm 406. As the fluid level falls, the spherical magnet falls in the direction of arrow G to a second lower position 410 aided by the weight of the tethered ballast drag element 402 that is filled with the working fluid. As the fluid level rises again and the ballast drag element is below the rising surface of the fluid level, the ballast drag element, being of substantially the same specific gravity as the working fluid, will not add weight to the hollow floating spherical magnet. An alternative arrangement can be provided where the working fluid is forced out of the interior of the ballast drag element when the spherical magnet is in the lower position. The interior of the ballast drag element would then be filled with gas, which would aid in the rising of the spherical magnet. The interior of the ballast drag element would then refill with working fluid when it reached the upper position or as it rose to the upper position. This embodiment could be facilitated by providing fluid communication from the interior of the spherical magnet through the tether to the interior of the ballast drag element. It could also utilize bladders to separate the fluid from the gas, check valves and the heating and cooling cycles of the working fluid.

Figure 11:
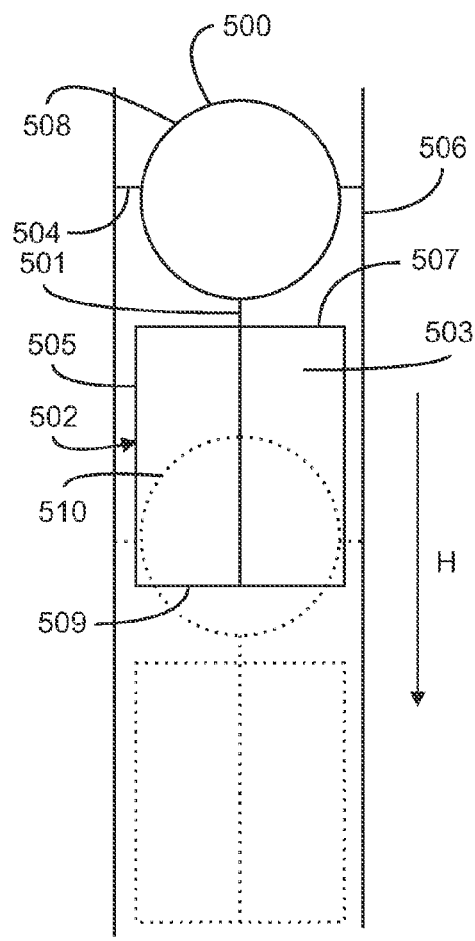
FIG. 11 is a schematic representation of another embodiment of a ballast drag biasing member for use in an engine in accordance with the present invention.

In another embodiment as illustrated in FIG. 11, the spherical magnet 500 is attached through a tether 501 to a ballast drag element 502 having a cylindrical shape. The cylinder includes an open top 507 and a closed bottom 509 to which the tether 501 is attached. Alternatively, the cylinder has a closed top or holes in the top, sides or bottom. The ballast drag element includes a hollow interior 503 that is filled with the working fluid and sides 505 that are formed of a thin material for example a metal or plastic. The sides are formed so as to add as little weight as possible and can be selected to have a specific gravity as close as possible or substantially equal to the specific gravity of the working fluid, i.e., the low boiling point liquid. In a first upper position 508, the spherical magnet 500 floats on the surface of the working fluid 504 that has risen up through the connecting arm 506. As the fluid level falls, the spherical magnet falls in the direction of arrow H to a second lower position 510 aided by the weight of the tethered ballast drag element 502 that is filled with the working fluid. As the fluid level rises again and the ballast drag element is below the rising surface of the fluid level, the ballast drag element, being of substantially the same specific gravity as the working fluid, will not add weight to the hollow floating spherical magnet. An alternative arrangement can be provided where the working fluid is forced out of the interior of the ballast drag element when the spherical magnet is in the lower position. The interior of the ballast drag element would then be filled with gas, which would aid in the rising of the spherical magnet. The interior of the ballast drag element would then refill with working fluid when it reached the upper position or as it rose to the upper position. This embodiment could be facilitated by providing fluid communication from the interior of the spherical magnet through the tether to the interior of the ballast drag element. It could also utilize bladders to separate the fluid from the gas, check valves and the heating and cooling cycles of the working fluid.

Figure 12:
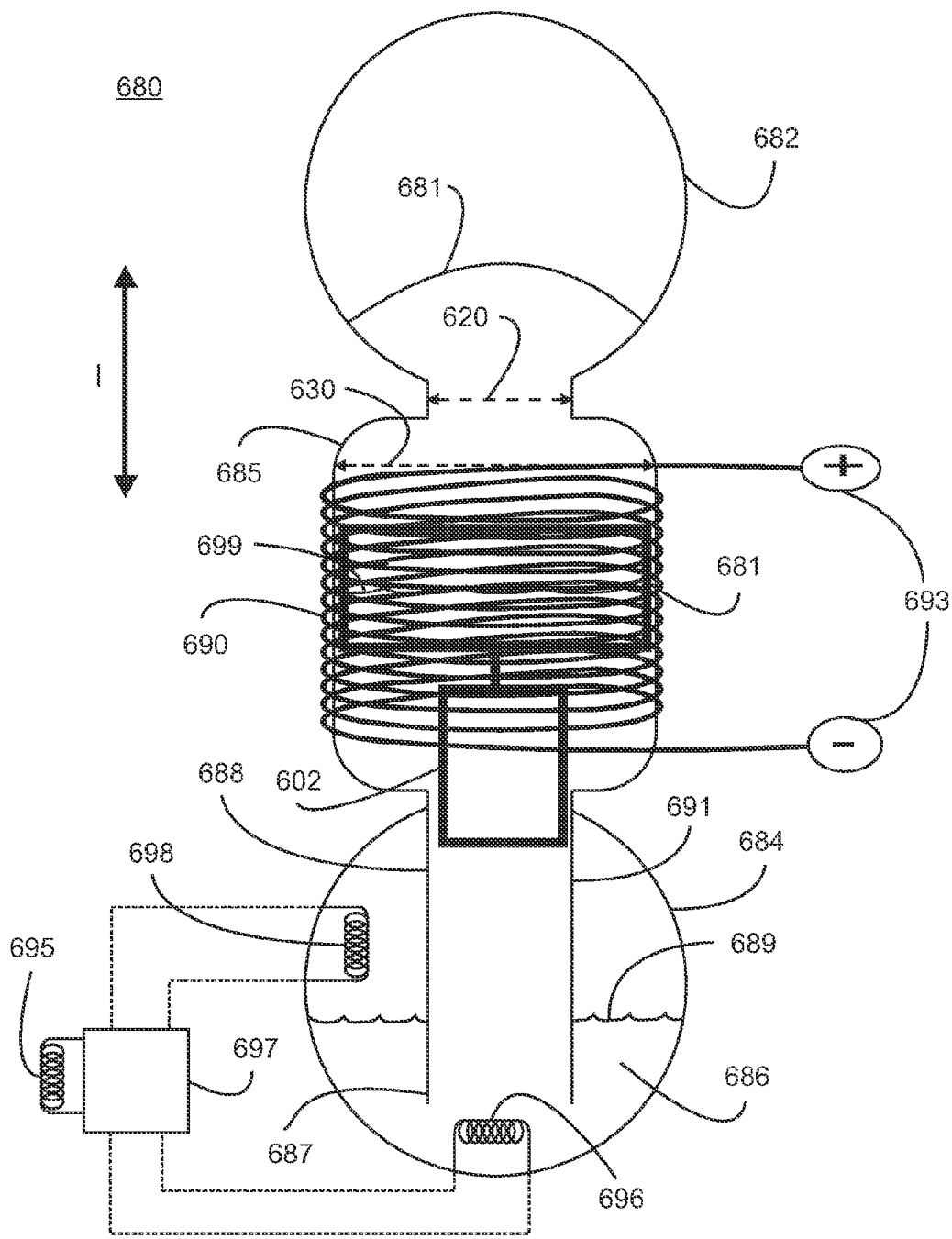
FIG. 12 is a schematic representation of yet another embodiment of an engine in accordance with the present invention having a connecting arm with an enlarged portion and a cylindrical permanent magnet.

In order to increase the efficiency and power output of embodiments of the reciprocating electrical generator of the present invention, the size and geometries of the wire coil, connecting arm and magnet are modified. Referring to FIG. 12, an embodiment of the reciprocating electrical generator 680 is illustrated that utilizes a hollow, buoyant permanent magnet such as a cylindrical magnet 681. This generator 680 includes a first container 684 located in a bottom or lowermost position and a second container 682 located in a top or uppermost position. The first and second containers are fixedly secured together and brought into fluid contact through a connecting arm 688 that includes a central tube or central hollow bore 691. In this embodiment, the connecting arm 688 extends into the first container 684 but only contacts the second container 682 and does not extend into the second container 682. This allows all fluid that enters the second container to drain from the second container through the connecting arm.

The connecting arm 688 includes an enlarged central portion or bulge 685 disposed between the first and second containers. The connecting arm has a first diameter 620 at points of contact with the first and second or top and bottom containers. The enlarged portion has a second diameter 630, and the second diameter is larger than the first diameter. The cylindrical permanent magnet 681 is disposed within this enlarged central portion of the central hollow bore, which accommodates a larger cylindrical magnet having an increased diameter and increased surface area. In one embodiment, the enlarged central portion 685 is also cylindrical and concentric with the connecting arm 688 and has a larger diameter than the connecting arm. For example, this large diameter can be 2, 3 or 4 times larger than the diameter of the connecting arm that contacts each container.

In one embodiment, the top container is larger in volume than the lower container to minimize compression backpressure. In one embodiment, a flexible or expandable bladder 681 is disposed in the second container 682. This bladder can expand or stretch to provide the desired sufficient amount of volume to permit expansion of the low boiling point liquid. In addition, the bladder has an elasticity that biases the bladder toward its original or unstretched state. This creates a pressure that acts as a biasing force on the cylindrical magnet, biasing the cylindrical magnet toward the first container.

Disposed within the first container is a quantity of the low-boiling point liquid 686. A sufficient amount of liquid is disposed in the first container such that the open end 687 of the connecting arm that is disposed in the first container is always located below the surface level 689 of the liquid in the first container 684. Therefore, during all cycles of the engine, the open end of the connecting arm is below the surface of the liquid. In one embodiment, the cylindrical magnet 681 is tethered to a ballast drag element 602 disposed within the connecting arm 688. Suitable ballast drag elements are described herein. In one embodiment, the ballast drag element 602 is a cylindrical bucket and is sized to pass through the connecting arm 688 including the central bore 691 of the connecting arm that is smaller in cross-section or diameter than the enlarged central portion 685.

The cylindrical magnet 681 is located within the enlarged portion 685 of the connecting arm 688 and its central bore 691 and is buoyant. The cylindrical magnet has a cross-section with a diameter that is larger than the first diameter of the central hollow bore. In one embodiment, the cylindrical magnet 681 includes a buoyant material that is compatible with the low-boiling point liquid. Alternatively, the cylindrical magnet 681 is a hollow cylinder. In one embodiment, the cylindrical magnet has a polarity that is aligned about the midline of the cylinder. Therefore, the top of the cylinder is one pole, and the bottom of the cylinder is the opposite pole. Preferably, the cylindrical magnet is constructed to provide a uniform charge across the entire surface of the cylinder. Therefore, the entire outer surface of the cylinder is a first pole, and the entire inner surface of the cylinder is a second pole that is magnetically opposite the first pole.

A wire coil 690 is wound around the exterior of the enlarged central portion 685 of the connecting arm 288 between the first and second containers. Suitable wire for the wire coil includes copper wire. Electrical leads or connections 693 are disposed on either end of the wire coil. These leads are connected to an electrical load, e.g., a battery or motor, as desired. The enlarged central portion 685 increases the size of the wire coil 690 and the length of the wire in the wire coil. Therefore, the present embodiment increases the surface area of the magnet and the surface area of the coil.

A first heat exchanger portion 696 of an active heat exchanger is disposed within the first container 684 in contact with the low-boiling point liquid 686. A second heat exchanger portion 698 is also disposed in the first container 684 in the space above the liquid. The first and second heat exchanger portions are in contact with a controller portion 697 that contains pumps, valves and electronics to control the operation of the active heat exchanger. A plurality of additional heat exchanger portions 695 are provided in contact with the controller portion. These additional heat exchanger portions provide for the transfer of heat between the containers and the ambient environment. The operation of the active heat exchanger is the same as the active heat exchangers discussed above, and the active heat exchanger transfers heat into and out of the first container.

The engine 680 utilizes the active heat exchanger to extract heat from the ambient environment. The active heat exchanger, for example a heat pump, consumes one unit of electrical energy to transfer 3, 4 or 5 units of heat energy. The inputted energy in the form of heat is introduced into the first container through at least one of the first and second heat exchanger portions. The introduction of heat energy into the first container increases the vapor pressure above the low-boiling point liquid in the bottom or lowermost container, forcing the liquid up through the connecting tube in the direction of the top or uppermost container, which acts as an expansion chamber. The rising level of liquid in the tube 699 floats or pushes the cylindrical or spherical magnet 681 through the tube and through the wire windings. The first container is then allowed to cool either passively or through the use of at least one of the first and second heat exchanger portions. When the first container is cooled, for example by a few degrees, the vapor pressure above the liquid in the first container will decrease. The level of fluid in the tube will fall down through the connecting arm, and the spherical magnet will also fall back through the tube and the wire windings. This process of heating and cooling is continued, and the magnet oscillates up and down through the tube and wire windings in the direction as indicated by arrow I. The vertical oscillation of a fixed magnet through the wire coil induces a current in the windings that is communicated to the leads and the loads attached to those leads.

Figure 13:
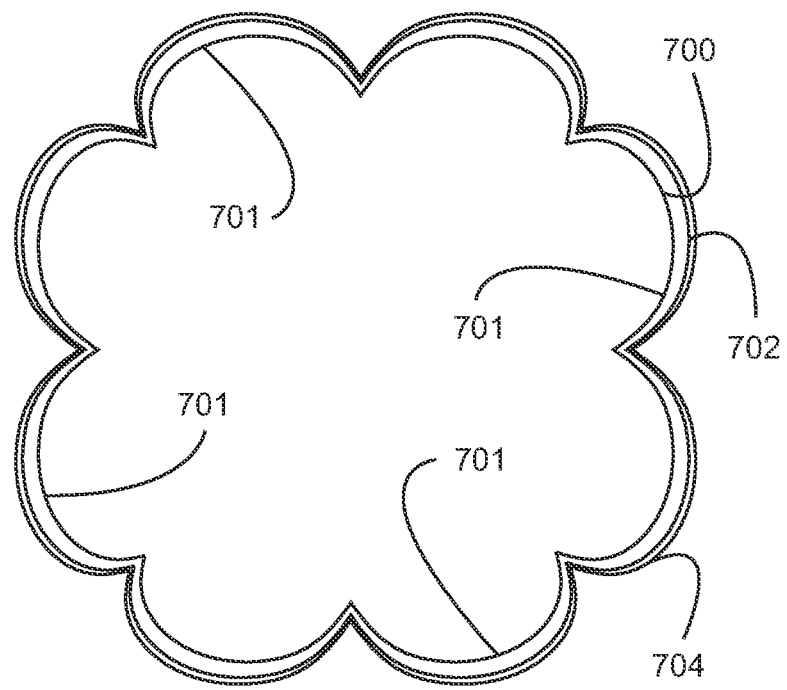
FIG. 13 is a schematic representation of an embodiment of a non-circular cross section of a connecting arm and permanent magnet for use in the engine of the present invention.

In addition to increasing the size of the connecting arm, wire coil and buoyant magnet as described above, the shape of the connecting arm and buoyant magnet can be modified to increase surface area. As the wire coil is wound around the exterior surface of the connecting arm, this also increases the size of the wire coil. Cross-sectional representations of the connecting arm, wire coil and buoyant magnet for exemplary shapes having a non-circular cross-section and increased surface are provided in FIGS. 13 and 14. In FIG. 13, the magnet 700 is generally cylindrical, but instead of a circular cross-section has a non-circular cross-section with a plurality of bulges 701 that effectively increase the surface area of the exterior of the cylinder. These bulges 701 yield a petal or flower appearance to the cross-section of the magnet 700. The connecting arm 702 in the region traversed by the magnet 700 has a complementary shape, and the wire coil 704 is wrapped around the connecting arm, following the complementary contours of the connecting arm. Since the surface area of the magnet 700 is increased, the surface area of the magnet exposed to the coil is also increased.

Figure 14:
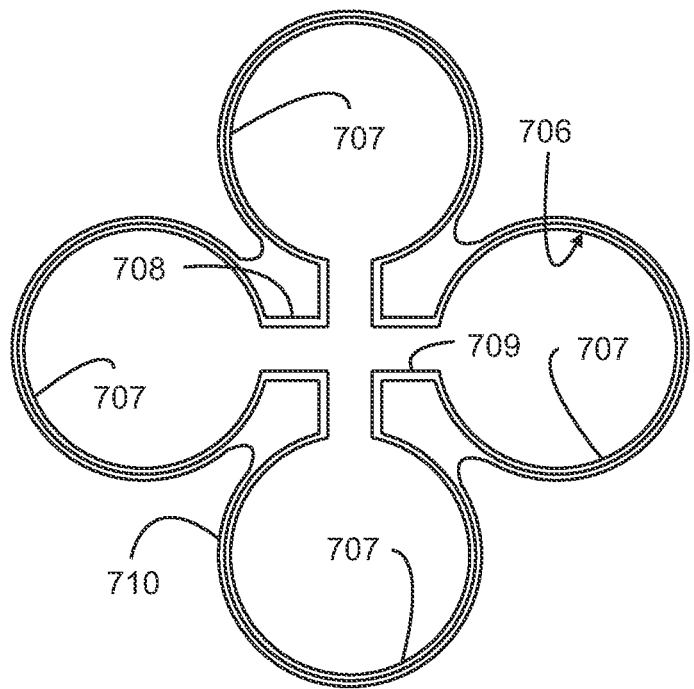
FIG. 14 is a schematic representation of another embodiment of a non-circular cross section of a connecting arm and permanent magnet for use in the engine of the present invention.

This same increase in the surface area of the magnet and coil is also achieved by the embodiment illustrated in FIG. 14. In this embodiment, the magnet 706 has a cloverleaf or four-leaf clover arrangement with four generally cylindrical, i.e., circular in cross section, portions 707 that are in contact and communication through a central stem portion 709. Although illustrated with four portions, other numbers of portions are possible, for example, 2, 6, 8 or more. Again, the multiple cylindrical portions effectively increase the surface area of the exterior of the cylinder. The connecting arm 708 and central hollow bore in the region traversed by the magnet 706 has a complementary shape, and the wire coil 710 is wrapped around the connecting arm, following the complementary contours of the connecting arm. Since the surface area of the magnet 706 is increased, the surface area of the magnet exposed to the coil is also increases. It is noted in this embodiment, that the wire coil does not follow all of the contours of the exterior surface of the connecting arm but is wrapped generally around the connecting arm and following the contours in the region of the cylindrical portions.

Exemplary embodiments in accordance with the present invention are also directed to applications utilizing or incorporating embodiments of the engine. Suitable applications utilize the mechanical or electrical work generated by the engine. Other applications leverage the ability of the engine of the present invention to provide cooling or heating to an ambient air or water environment. In addition, the engines of the present invention can be used to recapture water from the ambient environment through condensation. Applications can also take advantage of combinations of these properties of the engine, for example, utilizing electrical work or power, cooling or waste heat recapture and condensation.

In one embodiment, the engine of the present invention is used to provide heating or cooling to a house or other controlled space. The engine can also be used to provide refrigeration. The engine is used to remove heat from or to introduce heat into the desired controlled space. In general, the additional heat exchangers of the present invention are provided in contact with the space to be heated, cooled or refrigerated. In one embodiment, the engine uses the transferred heat or removed heat to produce mechanical or electrical power in conjunction with the heating and cooling.

In one embodiment, the engine is used to provide propulsion to a water craft. The additional heat exchangers associated with the engine are in contact with either the ambient air or water or both the air and the water to facilitate the desired heat transfer. As embodiments of the engine of the present invention require heat for the expansion of the working fluid, these engines are suitable for use with any application requiring the removal or reduction of waste heat. An example of such an application is a water desalination plant, and the engine is used to recover waste heat from the distillation process. In addition to removing the waste heat, the engine can also produce additional mechanical work or electrical power that can then be returned to and utilized by the desalination plant. The process for water desalination includes heating the water, e.g., preheating the water to be distilled with solar panels, adding the heat to boil the water for generating the steam, and then using the engine/generator to remove all heat input, condensing the steam down to "cold water."

In one embodiment, the present invention is directed to a combination heat transfer and electrical power generation system that includes a source of heat from an agricultural or industrial application in combination with an embodiment of an engine in accordance with the present invention. The plurality of additional heat exchanger portions in the engine is disposed in contact with the heat source. At least one of these additional heat exchangers can also be used as a condenser to reclaim water from the heat source. In another embodiment, the engine is used to provide electrical power to the electric motors of cars and trucks or any vehicle of ground transportation, or even, if so configured, for aircraft. Vehicles so described are also effectively power plants in and of themselves, and in the sense of distributed power production, these power plants will continue to operate 24/hours per day 7 days per week as long as the ambient environment or other heat source, e.g., industrial waste heat, is available to be actively extracted and transferred to the engine or generator. This electrical energy can be stored in batteries, used to dehydrate zeolite or polyvalent metal salts, which then act as a storage form of heat energy or fed directly into a smart grid.

Figure 15:
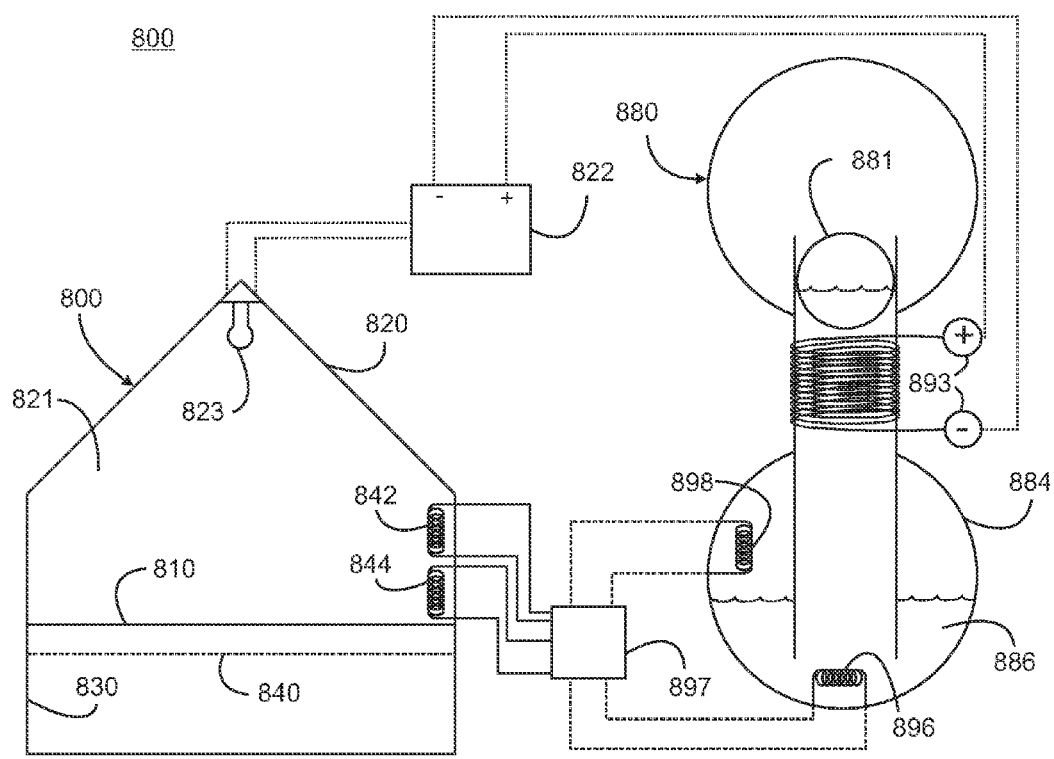
FIG. 15 is a schematic representation of an embodiment of a system for heat recovery and electrical power generation in accordance with the present invention.

In accordance with one embodiment as illustrated in FIG. 15, an embodiment of the system for transferring heat and generating electrical power 800 includes a reciprocating electrical generator 880, for example that includes a hollow spherical magnet 881 in combination with a heat source from an agricultural application. In general, the systems can include one or more engines in accordance with the present invention in combination with at least one heat source from at least one of an agricultural or industrial application. For example, the heat source could be a greenhouse from an agricultural application or a distillation unit in a desalination plant.

As illustrated, a heat source from an agricultural application is provided. This heat source is a greenhouse 800. The greenhouse 800 includes a greenhouse roof 820 that is arranged to capture solar energy to provide heat and light for the growth of plants within the greenhouse. Suitable arrangements of greenhouses are known and available in the art. The greenhouse 800 also includes walls 830 constructed from concrete, plastic or fiberglass, a volume of soil or other suitable growin medium 810 and a water table 840. The water table can be natural or artificially derived. In one embodiment, at least a portion of the walls of the greenhouse are formed by carving an appropriate cavity in the ground and lining that cavity with molten wax or a suitable flexible polymer lining.

The electrical generator engine 880 includes the lower first container 884 containing the appropriate volume of low boiling point working fluid 886, the first heat exchanger portion 896 disposed in the first container within the working fluid and the second heat exchanger portion 898 disposed within the first container above the working fluid. Both the first and second heat exchanger portions are in communication with the controller portion 897, which is in communication with a suitable power source (not shown). Also in communication with the controller portion are at least two additional heat exchanger portions 842, 844. The additional heat exchanger portions are disposed within the greenhouse 800 in contact with the air or environment 821 above the soil 810. In one embodiment, one or more of the additional heat exchanger portions can be located within the soil 810 or within the water table 840. The additional heat exchangers are used to introduce heat into or remove excess or waster heat from the air space 821 in the greenhouse 800. The additional heat exchangers can also be used to recapture moisture or recover water that is introduced into the air space through the transpiration of the plants growing it the greenhouse. In order to recapture this moisture, the additional heat exchangers are operated as condensers. The additional heat exchangers can provide the same function, i.e., heat removal, or can each provide a separate function, i.e., one heater and one condenser.

Any heat that is removed from the greenhouse is used by the engine 880 to produce electrical energy. This energy can be used to power devices, for example devices within the greenhouse such as lights 823, fans or controllers, among other devices. In one embodiment, the electrical leads 893 of the engine are in contact with one or more electrical loads such as a battery 822 or other suitable power storage device, and the engine is used to trickle charge the battery. The battery is then placed in contact with the devices within the greenhouse such as the lights 823 to provide the necessary power. This arrangement of the engines of the present invention can be used to remove waste heat from any environment, including houses, warehouses or industrial plants and to convert that waste heat into useful electrical energy to be recaptured and used.

The present invention is also directed to methods of using any of the embodiments of the engines in combination with industrial, agricultural, commercial or residential applications to exchange heat with a source of heat, to derive useful electrical or mechanical work using this heat and to provide water recovery, if desired.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An engine comprising:
   two containers arranged in a vertical alignment having a top container and a bottom container;
   a generally cylindrical connecting arm in communication with each container and comprising a central hollow bore, the connecting arm and central hollow bore comprising:
      a first diameter at points of contact with the top and bottom containers; and
      a second diameter disposed between the points of contact with the top and bottom containers, the second diameter larger than the first diameter, wherein the opposed pair of containers is in fluid communication through the central hollow bore of the connecting arm;
   a volume of a low boiling point liquid disposed in the bottom container;
   a wire coil wrapped around the connecting arm between the two containers along a length of the connecting arm having the second diameter;
   a permanent magnet buoyant in said low boiling point liquid disposed in the central hollow bore of the connecting arm along a length of the connecting arm having the second diameter; and
   an active heat exchanger in communication with the bottom container and capable of transferring heat to and removing heat from the bottom container.

2. The engine of claim 1, wherein the active heat exchanger comprises a heat pump.

3. The engine of claim 2, wherein the active heat exchanger comprises a first heat exchanger in communication with the liquid disposed in the bottom container, a second active heat exchanger disposed in the bottom container in a gas space above the liquid and a plurality of additional heat exchangers in communication with a controller and arranged to exchange heat with an ambient environment.

4. The engine of claim 1, wherein the low boiling point liquid comprises chlorofluorocarbons, hydrofluorocarbons, liquid ammonia, propane, carbon dioxide or butane.

5. The engine of claim 1, wherein the buoyant permanent magnet comprises a hollow cylindrical magnet.

6. The engine of claim 5, wherein an entire outer surface of the hollow cylindrical magnet comprises a first pole.

7. The engine of claim 6, wherein an entire inner surface of the hollow cylindrical magnet comprises a second pole that is magnetically opposite the first pole.

8. The engine of claim 6, wherein the hollow cylindrical magnet comprises a plurality of individual thin flexible rectangular plate magnets arranged as a continuous outer layer of the hollow cylindrical magnet.

9. The engine of claim 8, wherein each individual plate magnet comprises an inner magnetic material and an outer-magnetic material that extends around all four sides of the inner magnetic material.

10. The engine of claim 9, wherein the inner magnetic material comprises a polarity running from a first face of the rectangular plate magnet to a second face of the rectangular plate magnet.

11. The engine of claim 9, wherein the outer non-magnet material comprises an insulating material or a dielectric material.

12. The engine of claim 5, wherein the hollow cylindrical magnet comprises a circular cross-section having a diameter greater than the first diameter of the connecting arm and central hollow bore.

13. The engine of claim 5, wherein the hollow cylindrical magnet comprises a non-circular cross-section.

14. The engine of claim 13, wherein the non-circular cross-section comprises a plurality of bulges that increase an exterior surface area of the hollow cylindrical magnet.

15. The system of claim 1, wherein the heat source comprises a distillation unit at a desalination plant or a greenhouse.

16. The system of claim 1, further comprising an electrical load in communication with the wire coil.

17. The system of claim 1, wherein the electrical load comprises at least one battery, the system configured to trickle charge the battery.

18. The system of claim 1, wherein at least one of the plurality of additional heat exchangers is configured as a condenser to recover water from the heat source.

19. An engine comprising:
- two containers arranged in a vertical alignment having a top container and a bottom container;
- a generally cylindrical connecting arm in communication with each container and having a central hollow bore, wherein the connecting arm and the hollow central bore have a non-circular cross-section in a portion of the connecting arm disposed between the top and bottom containers and wherein the opposed pair of containers is in fluid communication through the hollow bore of the connecting arm;
- a volume of a low boiling point liquid disposed in the bottom container;
- a wire coil wrapped around the portion of the connecting arm between the two containers having the non-circular cross section;
- a hollow permanent magnet buoyant in said low boiling point liquid disposed in the portion of the central hollow bore of the connecting arm having the non-circular cross-section, the hollow cylindrical permanent magnet comprising a complementary non-circular cross section to the non-circular cross section of the central hollow bore; and
- an active heat exchanger in communication with the bottom container and capable of transferring heat to and removing heat from the bottom container.

* * * * *